(12) United States Patent
Ku et al.

(10) Patent No.: US 11,907,022 B2
(45) Date of Patent: Feb. 20, 2024

(54) PHYSICAL KEYBOARDS FOR MULTI-DISPLAY COMPUTING DEVICES

(71) Applicant: Intel Corporation, Santa Clara, CA (US)

(72) Inventors: Jeff Ku, Taipei (TW); Tim Liu, Taipei (TW); Yihua Lai, Santa Clara, CA (US); Lance Lin, Taipei (TW); Gavin Sung, Taipei (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/306,706

(22) Filed: Apr. 25, 2023

(65) Prior Publication Data

US 2023/0333604 A1    Oct. 19, 2023

Related U.S. Application Data

(63) Continuation of application No. 17/893,931, filed on Aug. 23, 2022, now Pat. No. 11,662,777, which is a continuation of application No. 17/173,485, filed on Feb. 11, 2021, now Pat. No. 11,455,016, which is a continuation of application No. 16/216,240, filed on Dec. 11, 2018, now Pat. No. 10,955,877.

(51) Int. Cl.
| | |
|---|---|
| *G06F 1/16* | (2006.01) |
| *G06F 3/02* | (2006.01) |
| *G06F 3/0354* | (2013.01) |

(52) U.S. Cl.
CPC .......... *G06F 1/1662* (2013.01); *G06F 1/1616* (2013.01); *G06F 1/1647* (2013.01); *G06F 1/1681* (2013.01); *G06F 3/0213* (2013.01); *G06F 3/03547* (2013.01)

(58) Field of Classification Search
CPC .... G06F 1/1662; G06F 1/1616; G06F 1/1647; G06F 1/1681; G06F 3/0213; G06F 3/03547; G06F 1/1643; G06F 1/1666; G06F 1/1677; G06F 1/169; G06F 3/023
See application file for complete search history.

(56) References Cited

U.S. PATENT DOCUMENTS

| | | |
|---|---|---|
| 6,003,052 A | 12/1999 | Yamagata |
| 10,031,559 B1 | 7/2018 | Hamel |
| 10,120,420 B2 | 11/2018 | Bathiche |
| (Continued) | | |

OTHER PUBLICATIONS

United States Patent and Trademark Office, "Restriction Requirement," issued in connection with U.S. Appl. No. 16/216,240, dated Mar. 19, 2020, 5 pages.

(Continued)

*Primary Examiner* — Andrew Sasinowski
(74) *Attorney, Agent, or Firm* — HANLEY, FLIGHT & ZIMMERMAN LLC

(57) ABSTRACT

Apparatus, systems, articles of manufacture, and methods are disclosed for physical keyboards with multi-display computing devices. An example keyboard includes a plurality of keys and a translucent backplate having a first side and a second side. The example keyboard also includes a coating between the first side of the backplate and the plurality of keys, the coating to pass light to illuminate the plurality of keys, and the coating to obscure the plurality keys when viewed from the second side of the backplate.

20 Claims, 11 Drawing Sheets

(56) References Cited

U.S. PATENT DOCUMENTS

| | | | |
|---|---|---|---|
| 10,254,803 | B1 | 4/2019 | Quinn |
| 10,955,877 | B2 | 3/2021 | Ku |
| 10,990,270 | B2 * | 4/2021 | Wilson ............... G06F 3/0485 |
| 11,237,643 | B2 | 2/2022 | Kulkarni |
| 11,455,016 | B2 | 9/2022 | Ku |
| 11,662,777 | B2 | 5/2023 | Ku et al. |
| 2004/0001306 | A1 | 1/2004 | Oakley |
| 2015/0277499 | A1 | 10/2015 | MacDonald |
| 2016/0202733 | A1 | 7/2016 | Ho |
| 2017/0139439 | A1 | 5/2017 | Okuley |
| 2017/0169741 | A1 | 6/2017 | Lim |
| 2017/0220071 | A1 | 8/2017 | Elliott |
| 2017/0251087 | A1 | 8/2017 | Lumbard |
| 2017/0257131 | A1 | 9/2017 | Debates |
| 2017/0300089 | A1 | 10/2017 | Hampton |
| 2017/0329370 | A1 | 11/2017 | Han |
| 2017/0357473 | A1 | 12/2017 | Kim |
| 2018/0046225 | A1 | 2/2018 | Amarilio |
| 2018/0077810 | A1 | 3/2018 | Moon |
| 2018/0081515 | A1 * | 3/2018 | Block ............... G06F 3/04817 |
| 2018/0108330 | A1 | 4/2018 | Wallace |
| 2018/0188775 | A1 | 7/2018 | Perelli |
| 2018/0188780 | A1 | 7/2018 | Perelli |
| 2018/0196473 | A1 | 7/2018 | Smith |
| 2018/0210504 | A1 | 7/2018 | Moser |
| 2018/0210508 | A1 | 7/2018 | Aurongzeb |
| 2018/0292860 | A1 | 10/2018 | Siddiqui |
| 2018/0329453 | A1 | 11/2018 | Elias |
| 2019/0121399 | A1 | 4/2019 | Ku |
| 2019/0129516 | A1 | 5/2019 | Morrison |
| 2019/0220064 | A1 | 7/2019 | Park |
| 2019/0235638 | A1 * | 8/2019 | Lee ............... G06F 40/40 |
| 2019/0258300 | A1 | 8/2019 | Gerardi |
| 2019/0346885 | A1 * | 11/2019 | Sepulveda ............ G06F 3/0482 |
| 2020/0117284 | A1 | 4/2020 | Kulkarni |
| 2020/0233538 | A1 | 7/2020 | Aurongzeb |
| 2020/0341515 | A1 | 10/2020 | Moser |

OTHER PUBLICATIONS

Surface Pro and keyboard, last retrieved Apr. 13, 2020, 1 page.
Pegatron Magneto, last retrieved Apr. 13, 2020, 1 page.
Intel Copper Harbor 12, last retrieved Apr. 13, 2020, 1 page.
Lenovo Yogabook 2, last retrieved Apr. 13, 2020, 1 page.
IPad and keyboard, last retrieved Apr. 13, 2020, 1 page.
United States Patent and Trademark Office, "Non-Final Rejection" issued connection with in U.S. Appl. No. 16/216,240, dated Jun. 19, 2020, 8 pages.
United States Patent and Trademark Office, "Notice of Allowance" issued in connection with U.S. Appl. No. 16/216,240, dated Nov. 10, 2020, 9 pages.
United States Patent and Trademark Office, "Non-Final Office Action," issued in connection with U.S. Appl. No. 17/173,485, dated Jan. 27, 2022, 6 pages.
United States Patent and Trademark Office, "Notice of Allowance," issued in connection with U.S. Appl. No. 17/173,485, dated May 10, 2022, 8 pages.
United States Patent and Trademark Office, "Notice of Allowability," issued in connection with U.S. Appl. No. 17/173,485, dated Aug. 30, 2022, 2 pages.
United States Patent and Trademark Office, "Corrected Notice of Allowability" issued in connection with U.S. Appl. No. 16/216,240, dated Feb. 19, 2021, 3 pages.
United States Patent and Trademark Office, "Corrected Notice of Allowability" issued in connection with U.S. Appl. No. 16/216,240, dated Dec. 24, 2020, 3 pages.
United States Patent and Trademark Office, "Notice of Allowance" issued in connection with U.S. Appl. No. 17/893,931, dated 25, 2023, 8 pages.
European Patent Office, "Communication pursuant to Article 94(3) EPC", issued in connection with European Patent Application No. 20194492, dated Mar. 13, 2023, 6 pages.
United States Patent and Trademark Office, "Corrected Notice of Allowability" issued in connection with U.S. Appl. No. 17/893,931, dated Apr. 10, 2023, 2 pages.

* cited by examiner

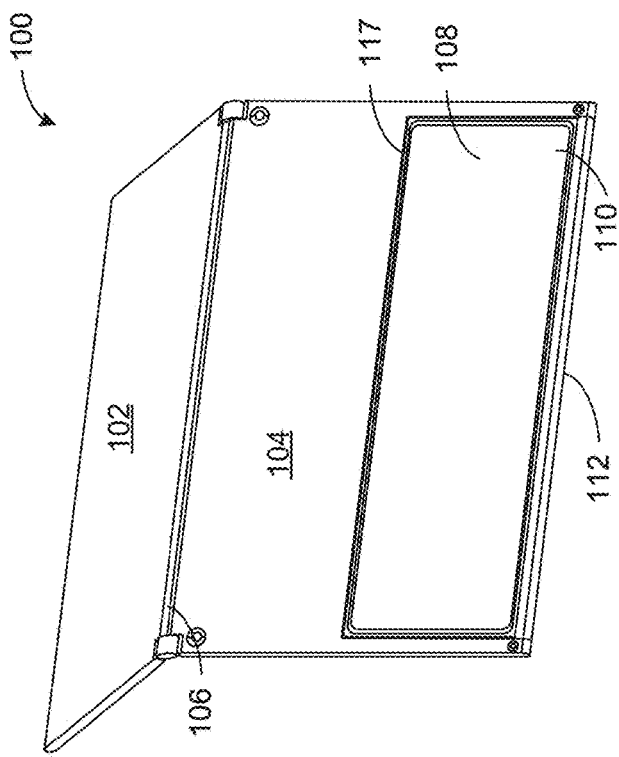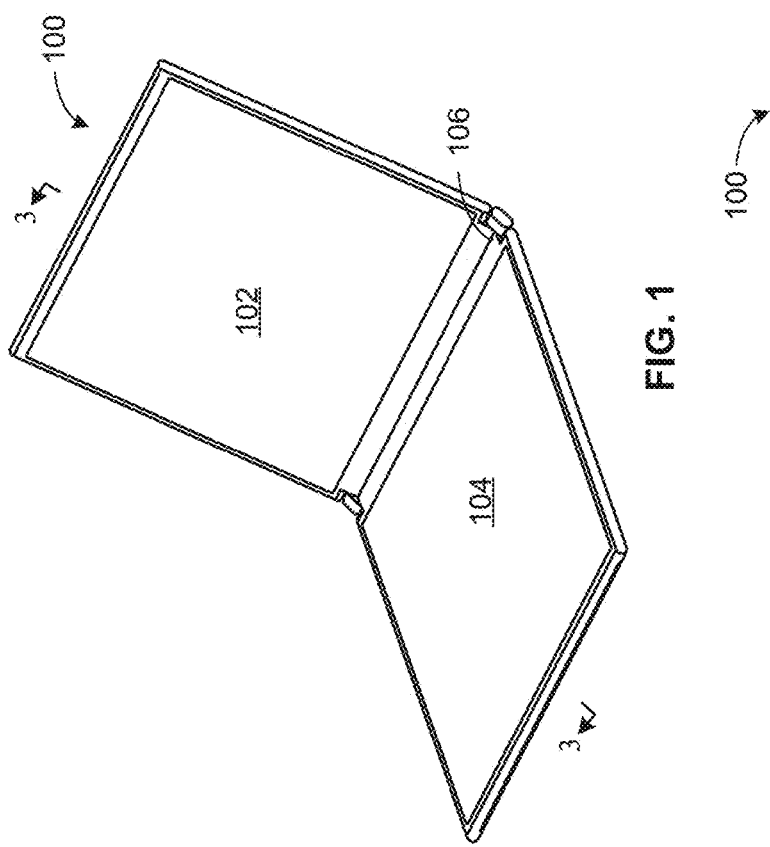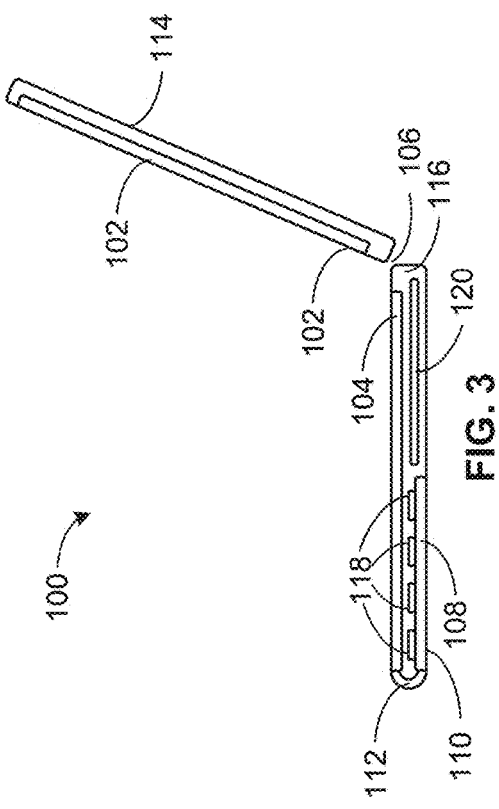

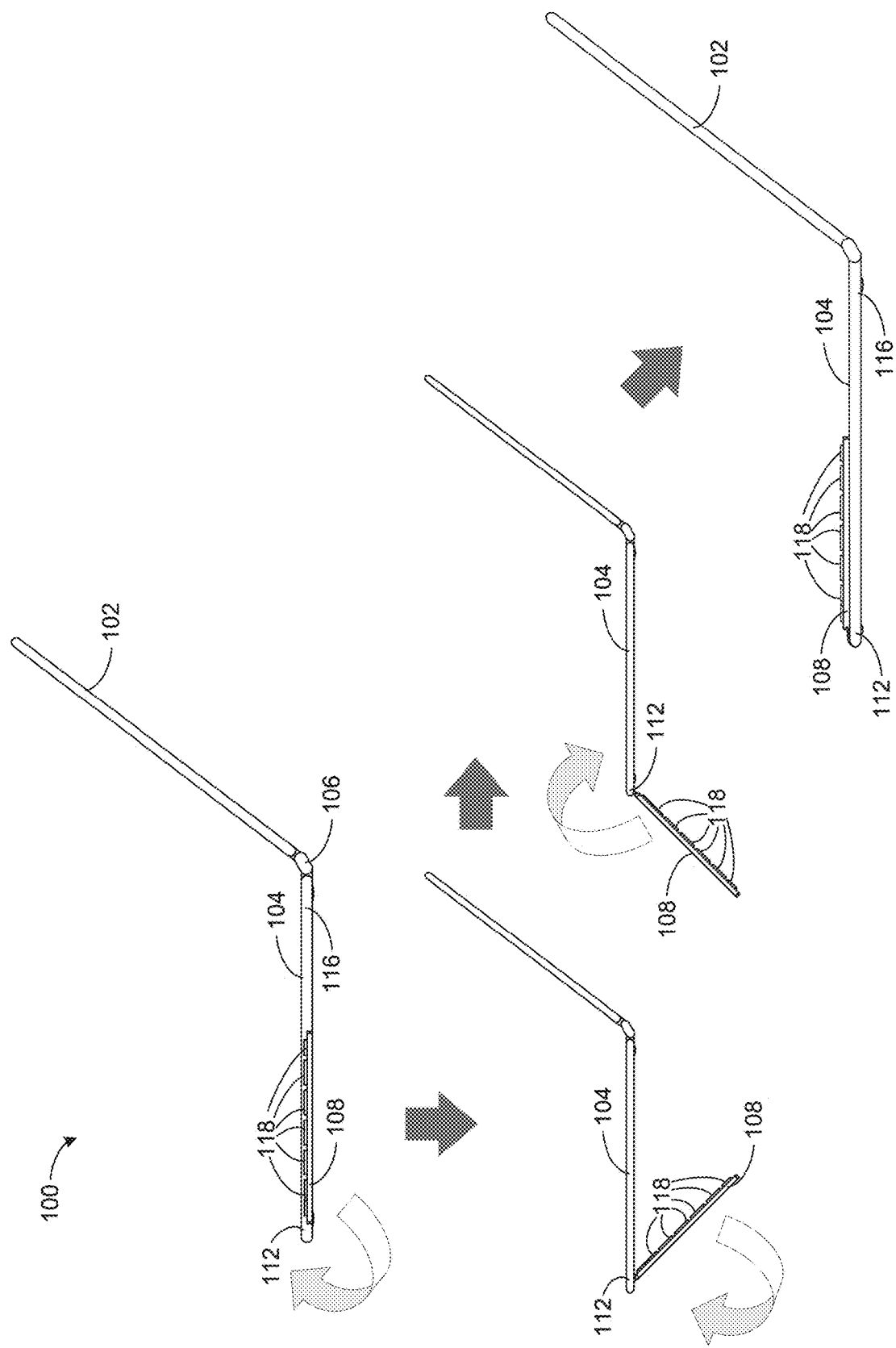

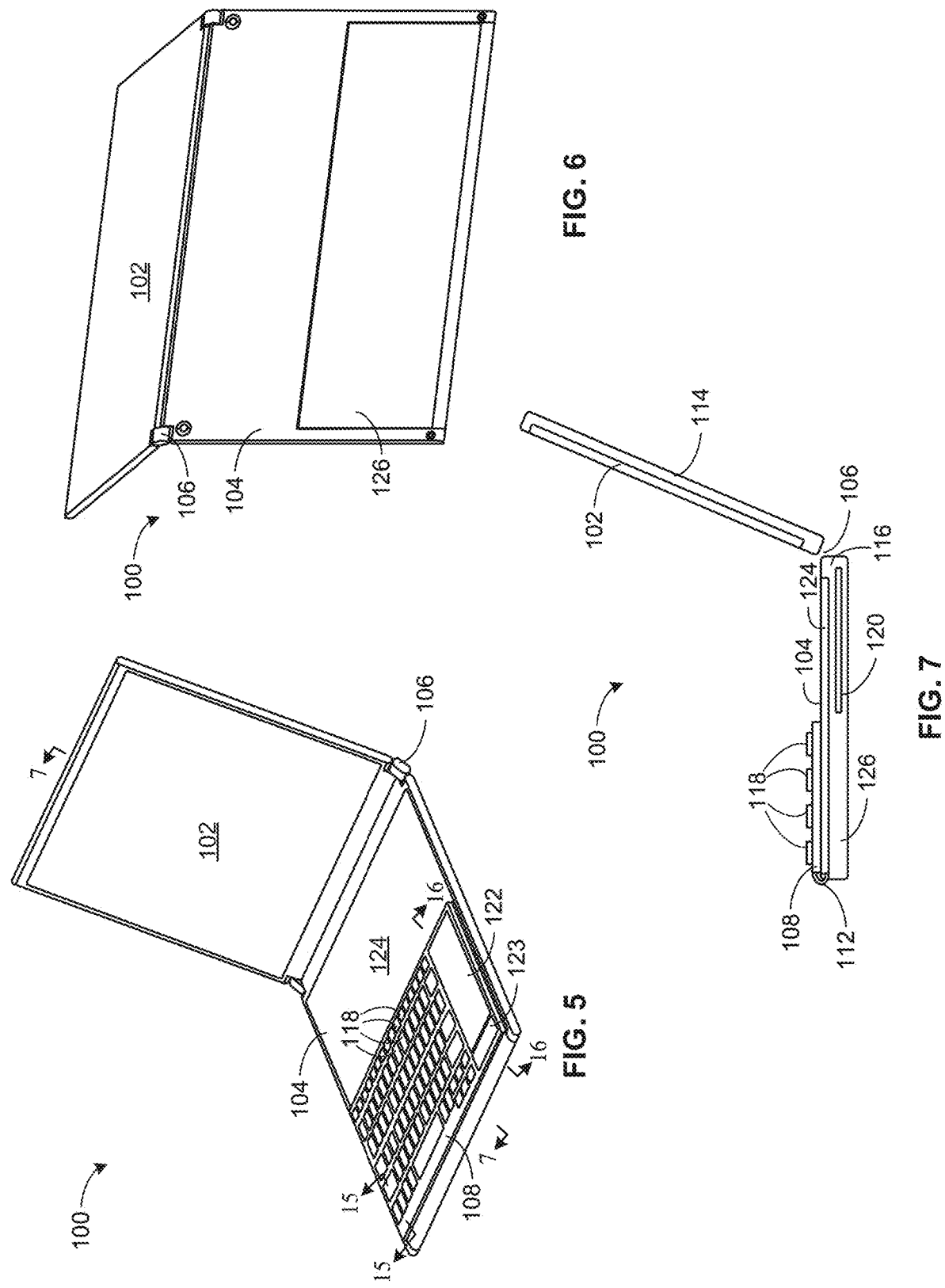

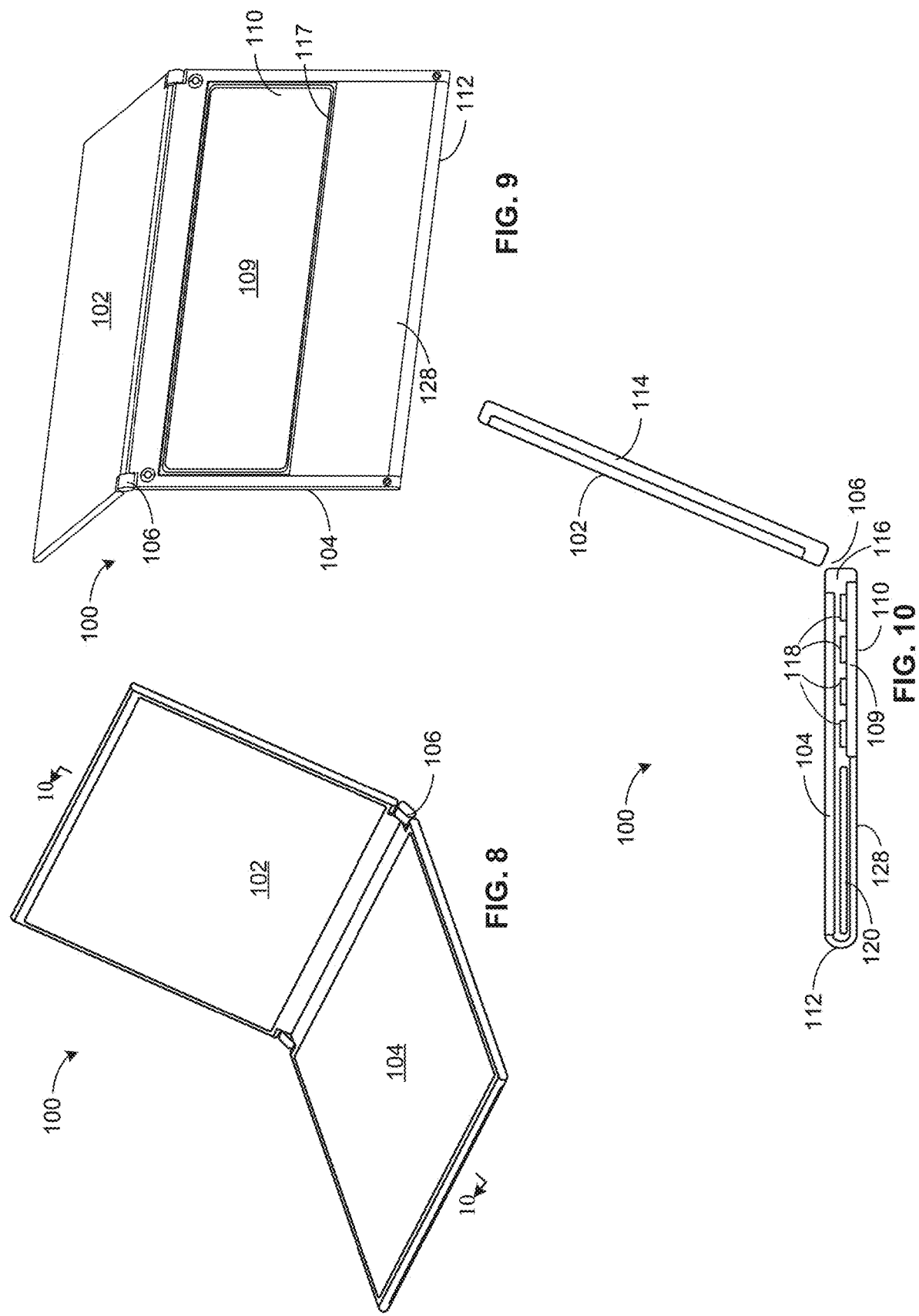

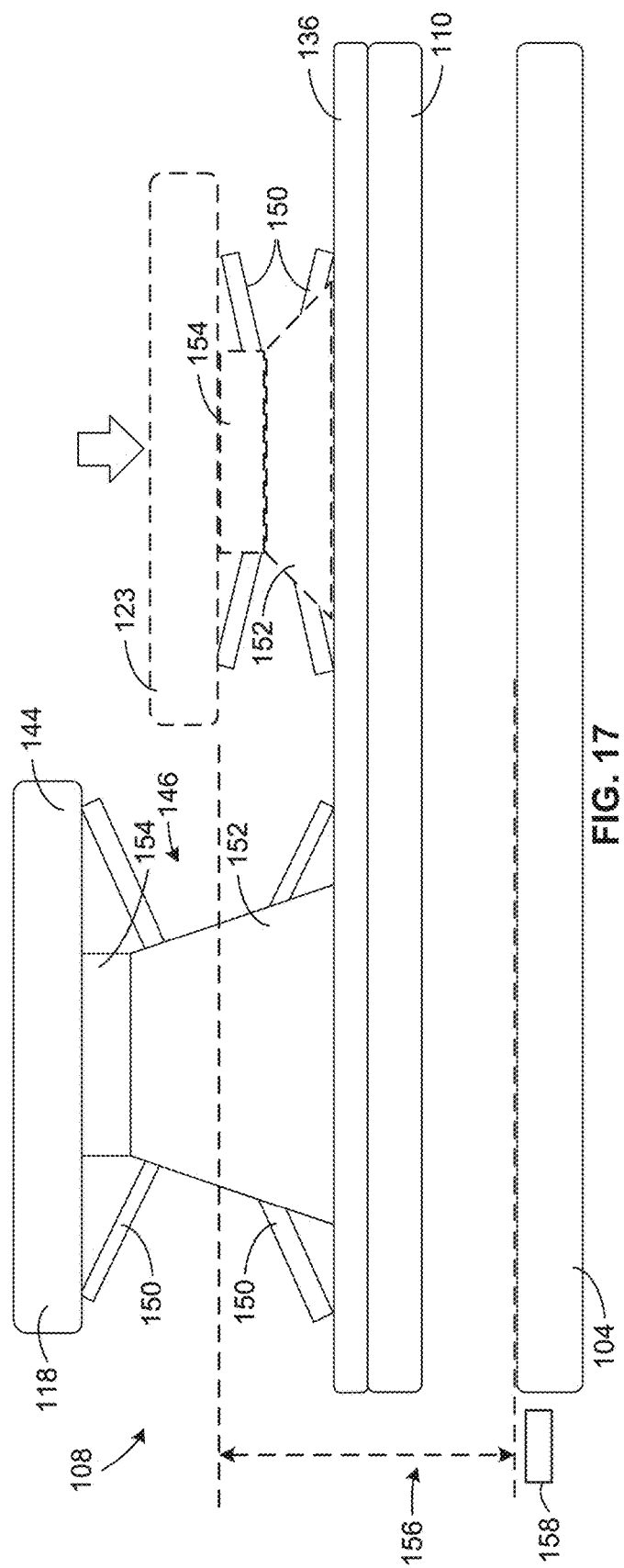
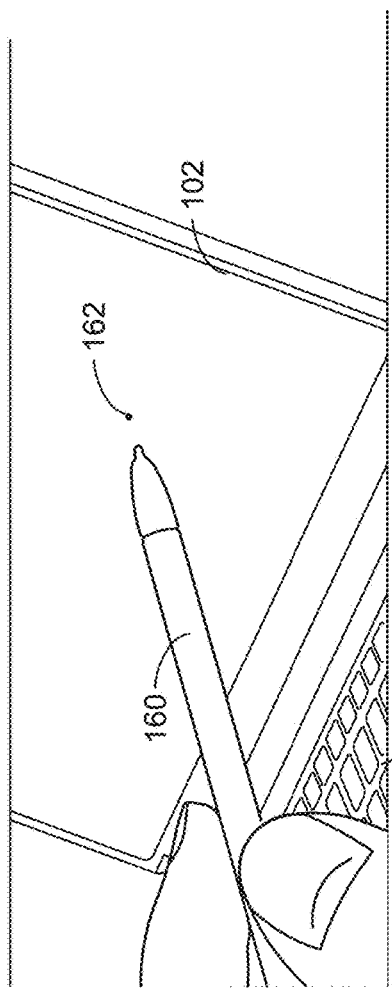
FIG. 17
FIG. 18

PHYSICAL KEYBOARDS FOR MULTI-DISPLAY COMPUTING DEVICES

RELATED APPLICATIONS

This patent arises from a continuation of U.S. patent application Ser. No. 17/893,931, which was filed on Aug. 23, 2022, which is a continuation of U.S. patent application Ser. No. 17/173,485, which was filed on Feb. 11, 2021, which is a continuation of U.S. patent application Ser. No. 16/216,240, which was filed on Dec. 11, 2018. U.S. patent application Ser. No. 17/893,931, U.S. patent application Ser. No. 17/173,485, and U.S. patent application Ser. No. 16/216,240 are hereby incorporated herein by reference in their entireties. Priority to U.S. patent application Ser. No. 17/893,931, U.S. patent application Ser. No. 17/173,485, and U.S. patent application Ser. No. 16/216,240 is hereby claimed.

FIELD OF THE DISCLOSURE

This disclosure relates generally to computing devices, and, more particularly, to physical keyboards for multi-display computing devices.

BACKGROUND

Some multi-display computing devices include a software-based keyboard that appears on one of the displays of the computing device to enable the user to type. User experience typing on a software-based keyboard is typically unsatisfactory compared to a physical keyboard.

BRIEF DESCRIPTION OF THE DRAWINGS

FIG. 1 is a schematic illustration of a perspective view of an example dual display computing device with an example physical keyboard in accordance with the teachings of this disclosure where the computing device is in an open position and the keyboard is in a stowed position.

FIG. 2 is a schematic illustration of a bottom view of the computing device of FIG. 1 with the keyboard stowed toward a front of the computing device.

FIG. 3 is a cross sectional view of the computing device of FIG. 1 taken along the 3-3 line of FIG. 1.

FIG. 4 is a schematic illustration of the computing device of FIG. 1 showing transition of the keyboard from the stowed to the deployed position.

FIG. 5 is a schematic illustration of a perspective view of the computing device of FIG. 1 with the keyboard in the deployed position.

FIG. 6 is a schematic illustration of bottom view of the computing device of FIG. 5 with the keyboard in the deployed position showing an example recess for stowage of the keyboard.

FIG. 7 is a cross sectional view of the computing device of FIG. 5 taken along the 7-7 line of FIG. 5.

FIG. 8 is a schematic illustration of a perspective view of the example computing device of FIG. 1 with an alternative example physical keyboard in an alternative stowed position.

FIG. 9 is a schematic illustration of a bottom view of the computing device of FIG. 8 with the physical keyboard stowed toward a rear of the computing device.

FIG. 10 is a cross sectional view of the computing device of FIG. 8 taken along the 10-10 line of FIG. 8.

FIG. 17 is an enlarged view of an example keyboard and example activation zone.

FIG. 18 is an enlarged view of an example stylus and example display.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 11:
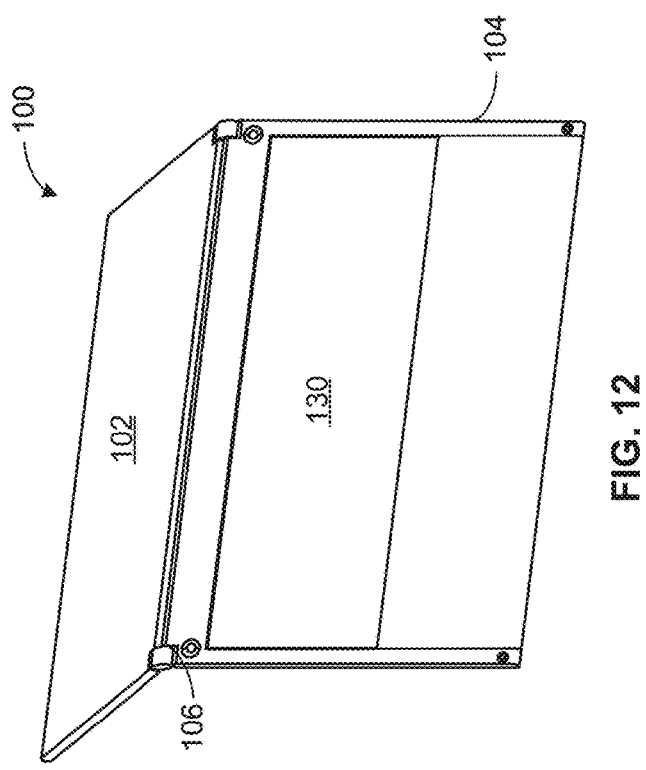
FIG. 11 is a schematic illustration of a perspective view of the computing device of FIG. 8 with the keyboard in an alternative deployed position.

Users of computing devices such as laptops, tablets, and flexible display devices that include dual displays or multiple displays have been hesitant to adopt form factors that implement a software-based keyboard that appears on a screen or display of the computing device. As used herein "dual display" means two displays, and "multiple display" means two or more displays. The disclosures herein related to dual displays apply to multiple displays and vice versa. In addition, "screen" and "display" maybe used interchangeably. A software-based keyboard appearing on the display of the computing device is two-dimensional and fails to provide a satisfactory typing experience for the user. Some purveyors of such computing devices offer physical keyboards that are separately sold as accessories for the computing device, which adds costs. In addition, these accessories are stowed separately, increasing the likelihood the accessories are misplaced or lost.

Disclosed herein are example multi-display computing devices that have example physical keyboards that are stowable with the device. The physical keyboards provide users with a gratifying typing experience as the users are able to depress physical keys on the keyboard. In addition, users are able to type more quickly on a physical keyboard than on a software-based keyboard. In some examples, the keyboards are tethered to the computing devices via, for example, a soft hinge. In some examples, the soft hinge is a flexible band. In some examples, the soft hinge is an elastic band. Deployment and stowage of the keyboards enable the computing devices to switch between single display and multiple display modes.

Also disclosed herein are example keyboard illumination mechanisms that leverage the illumination of one of the displays of the computing device. For example, the keyboard is disposed on the display, and the illumination of the display is transmitted through the keyboard from the beneath. The illumination of the display lights the keys of the keyboard to enable a user to identify the keys of the keyboard by sight in a dark environment. These example illumination features of the keyboard and computing device enable a reduction in the components of the keyboard because the keyboard does not need to include a backlit module or other dedicated illumination hardware within the chassis of the keyboard. The simplified keyboard structure allows a reduction in the height and thickness of the keyboard, which facilitates stowage in the computing device.

Also disclosed herein are example keyboard triggering mechanisms in which displacement of a key of the keyboard is detected by a sensor. The displaced key is identified and correlated to a software-based or emulated keyboard on one of the displays of the computing device, where data related to the identified key is further processed by the computing device. In this example, the keys of the keyboard are not directly wired to components of the computing device. Thus, the circuitry and other hardware used to connect the keys of a keyboard in a traditional keyboard, including flex cables, may be excluded from the example keyboard. This reduction in keyboard components further enables a reduction in the height or the thickness of the keyboard and in the cost of the system without affecting functionality of the keyboard.

FIG. 1 is a schematic illustration of a perspective view of an example dual display computing device 100. The computing device 100 is in an open position and includes an example first display 102 and an example second display 104. The first display 102 and the second display 104 are coupled via means for coupling the first display 102 and the second display 104 including, for example, an example first hinge 106.

FIG. 2 is a schematic illustration of a bottom view of the computing device 100 of FIG. 1. The computing device 100 includes an example keyboard 108. As shown in FIG. 2, the keyboard 108 is in a stowed position where an example backplate 110 of the keyboard 108 is positioned facing toward the exterior of the computing device 100. In this example, the keyboard 108 is stowed toward a front of the computing device 100. In this context, the "front" of the computing device 100 is the side of the computing device 100 adjacent a user of the computing device 100 when the computing device 100 is in use. The computing device 100 also includes an example means for coupling the keyboard 108 to the second display 104 including, for example, an example second hinge 112. In this example, the second hinge wraps around the front of the computing device 100.

FIG. 3 is a cross sectional view of the computing device of FIG. 1 taken along the A-A line of FIG. 1. As shown in FIG. 3, the computing device 100 includes an example first housing 114. The first display 102 is disposed in the first housing 114. The example computing device 100 also includes an example second housing 116. The second display 104 is disposed on a first side of the second housing 116. The keyboard 108 is stowed in the second housing 116 such that the backplate 110 is aligned with a second side of the second housing 116. In some examples, the backplate 110 is flush or substantially flush with the second side of the second housing 116. In such examples, the thickness or Z-height of the keyboard 108 is less than that of the second housing 116.

Also, in some examples, the backplate 110 includes example feet 117. In the illustrated example, the feet 117 is a continuous loop, forming a looped foot. In other examples, the feet 117 may be separate, discrete elements. Also, the illustrated example feet 117 are composed of a rubber material. In other examples, other materials or combination of materials may be used. In some examples, the feet 117 are included the reduced Z-height of the keyboard 108 and do not protrude or do not substantially protrude from the second side of the second housing 116.

In the stowed position, example keys 118 of the keyboard 108 are disposed in an interior of the second housing 116 and beneath the second display 104. The keyboard 108 is stowed adjacent to components of the second display 104 and/or the computing device 100 including, for example, a main processing board 120. In this example, the main processing board 120 is disposed in the second housing 116 adjacent to the first hinge 106 or otherwise closer to the first hinge 106 than the keyboard 108. In some examples, the second hinge 112 houses a flexible printed circuit to transmit signals between the main processing board 120 and the keyboard 108.

The second hinge 112 also is shown in FIG. 3. In this example, the second hinge 112 is a soft hinge. In some examples, the second hinge 112 is elastic including, for example, an elastic fabric. In some examples, the second hinge 112 may include an artificial leather. In other examples, other materials or combination of materials may be used.

FIG. 4 is a schematic illustration of the computing device 100 of FIG. 1 showing a transition of the keyboard 108 from the stowed position to a deployed position. When a user wants to remove the keyboard 108 from the stowed position, the user releases the keyboard 108 from the second side of the second housing 116. The keyboard 108 is rotated outward and pivots around via the second hinge 112. The keyboard 108 is placed on the surface of the second display 104 on the first side of the second housing 116 in a deployed or use position. In the deployed position, the keys 118 of the keyboard 108 face upward and are accessible by the user.

As noted above, in some examples, the second hinge 112 is a soft hinge. In other examples, the second hinge 112 may be a hard hinge. In such examples, the second hinge 112 enables the keyboard 108 to rotate from the stowed position to the deployed position along the front of the second housing 116 and/or second display 104.

FIG. 5 is a schematic illustration of a perspective view of the computing device 10 of FIG. 1 with the keyboard 108 in the deployed position. In this example, the deployed position is toward a front of the second display 104 and the second housing 116, for example on a palmrest. In addition to the keys 118, the keyboard 108 also includes an example trackpad 122 and an example trackpad button 123, which is a physical button. The trackpad 122 and trackpad button 123 can be used to control a mouse, for example. The flexible printed circuit in the second hinge 112 may also be used to transmit signals to and from the trackpad 122 and trackpad button 123.

In the example of FIG. 5, the keyboard 108 does not cover the entire second display 104. There is an exposed portion 124 of the second display 104. When the keyboard 108 is disposed on the second display 104, the computing device 100 can be set to a keyboard enabled mode. The keyboard enabled mode, in some examples, is a single display mode where the first display 102 is enabled and the second display 104 is not enabled and visual text, graphics, indicia, etc. are shown on the first display 102. Thus, in this example, the computing device is in a single display and keyboard mode. In some examples, in the keyboard enabled mode, the first display 102 and the exposed portion 124 of the second display 104 are used to present visual media to the user. Also, in some examples, the exposed portion 124 of the second display 104 may be used to provide additional function keys, emoticon insertion keys, and/or other input icons or keys.

FIG. 6 is a schematic illustration of a bottom view of the computing device 100 of FIG. 5 with the keyboard 108 in the deployed position and, thus, not visible in FIG. 6. FIG. 6 shows an example means for stowing the keyboard 108 including, for example, an example recess 126. In this example, the recess 126 is located on the second side of the second housing 116 distal to the first hinge 106 and near the front of the second display 104 and second housing 116.

The keyboard 108 is held into place in the recess 126 by a magnetic connection. For example, there are magnets or magnetic elements in or on the keyboard 108, there are complementary magnetic elements in or on the computing device 100. The attraction of the magnetic elements releasably hold the keyboard 108 in the recess 126. In other examples, other releasably couplable fasteners may be used such as, for example, latches, snaps, hook features, loop and hook fasteners, etc.

FIG. 7 is a cross sectional view of the computing device 100 of FIG. 5 taken along the B-B line of FIG. 5. FIG. 7 shows the keyboard 108 disposed on the second display 104 while connected to the second housing 116 via the second hinge 112. In addition, the position of the keyboard 108 relative to the exposed portion 124 of the second display 104 and alignment of the keyboard 108, second display 104, and recess 126 are also shown.

FIG. 8 is a schematic illustration of a perspective view of the example computing device 100 of FIG. 1 with an alternative example keyboard 109 in an alternative stowed position, as shown in FIGS. 9 and 10. FIG. 8 illustrates that the computing device 100 has the same appearance in the open position and dual display mode when the keyboard 108 is stowed in the position of FIG. 2 and when the keyboard 109 is stowed in the position of FIG. 9. The keyboard 108 of FIGS. 1-7 and the keyboard 109 of FIGS. 8-14 have similar features but are stowed in different areas of the computing device 100. Thus, disclosure in this patent, other than the location of the keyboards in the stowed and deployed positions, related to one keyboard 108, 109 applies equally to the other keyboard 109, 108.

FIG. 9 is a schematic illustration of a bottom view of the computing device 100 of FIG. 8 with the keyboard 109 stowed toward a rear of the computing device 100 adjacent to or otherwise closer to the first hinge 106 than the front of the second display 104. As shown in FIG. 9, the keyboard 109 is in a stowed position where the backplate 110 of the keyboard 109 is positioned facing toward the exterior of the computing device 100.

The computing device 100 also includes the second hinge 112 that couples the keyboard 109 to the second display 104. In this example, the second hinge wraps around the front of the computing device 100 from the keyboard 109. With the keyboard 109 stowed toward the rear of the computing device 100, the second hinge 112 wraps a longer distance to the front of the second display 104 than when the keyboard 108 is stowed toward the front the second display 104 and the computing device 100. To accomplish the longer wrapping distance, the second hinge 112, in this example, includes an example extension or tail 128. In the stowed position, the tail 128 covers a portion of the second side of the computing device 100. In this example, the tail 128 is the same material as the second hinge 112. In other examples, the tail 128 may be other materials or combination of materials.

FIG. 10 is a cross sectional view of the computing device 100 of FIG. 8 taken along the C-C line of FIG. 8. As shown in FIG. 10, the computing device 100 includes the first housing 114 in which the first display 102 is disposed. The computing device 100 also includes the second housing 116. The second display 104 is disposed on the first side of the second housing 116. The keyboard 109 is stowed in the second housing 116 such that the backplate 110 is aligned with a second side of the second housing 116. In some examples, the backplate 110 is flush or substantially flush with the second side of the second housing 116. In such examples, the thickness or Z-height of the keyboard 109 is less than that of the second housing 116.

In the stowed position, example keys 118 of the keyboard 109 are disposed in an interior of the second housing 116 and beneath the second display 104. The keyboard 109 is stowed adjacent to the main processing board 120 and other components of the second display 104 and/or the computing device 100. In this example, the main processing board 120 is disposed in the second housing 116 adjacent to the second hinge 112 or otherwise closer to the front of the second housing 116 than the keyboard 109. The main board 120 is also positioned between the second display 104 and the tail 128.

FIG. 11 is a schematic illustration of a perspective view of the computing device 100 of FIG. 8 with the keyboard 109 in an alternative deployed position. In this example, the deployed position is away from the palmrest and toward the rear of the second display 104 and the second housing 116 adjacent to or otherwise closer to the first hinge 106 than the front of the second display 104 and second housing 116. In the example of FIG. 5, the keyboard 109 does not cover the entire second display 104. However, the tail 128 of the second hinge 112 covers the portion of the second display 104 not covered by the keyboard 109, i.e., the palmrest.

Figure 12:
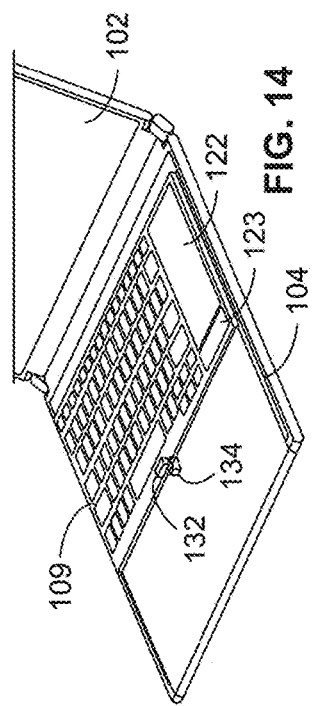
FIG. 12 is a schematic illustration of a bottom view of the computing device of FIG. 11 with the keyboard in the deployed position showing an example recess for stowage of the keyboard.

FIG. 12 is a schematic illustration of a bottom view of the computing device 100 of FIG. 8 with the keyboard 109 in the deployed position and, thus, not visible in FIG. 12. FIG. 12 shows an example means for stowing the keyboard 109 including, for example, the example recess 130 for stowage of the keyboard 109, which is similar to the recess 126 disclosed above. In this example, the recess 130 is located on the second side of the second housing 116 adjacent to the first hinge 106 and near the rear of the second display 104 and second housing 116.

The keyboard 109 is held into place in the recess 130 by a magnetic connection. For example, there are magnets or magnetic elements in or on the keyboard 109, there are complementary magnetic elements in or on the computing device 100. The attraction of the magnetic elements releasably hold the keyboard 109 in the recess 130. In other examples, other releasably couplable fasteners may be used such as, for example, latches, snaps, hook features, loop and hook fasteners, etc.

Figure 13:
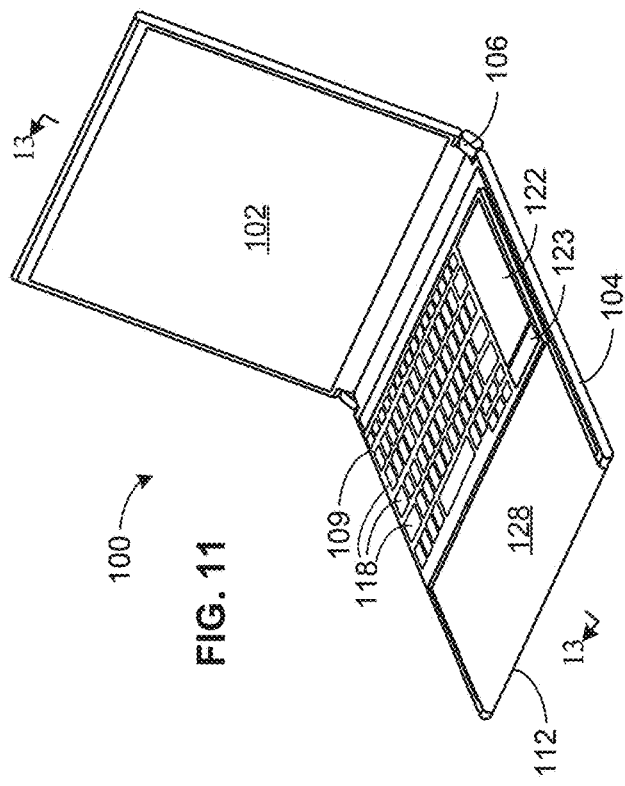
FIG. 13 is a cross sectional view of the computing device of FIG. 11 taken along the 13-13 line of FIG. 11.

FIG. 13 is a cross sectional view of the computing device 100 of FIG. 11 taken along the D-D line of FIG. 11. FIG. 13 shows the keyboard 109 disposed on the second display 104 while connected to the second housing 116 via the tail 128 and the second hinge 112. In addition, the position of the keyboard 109 relative to the first hinge 106 and alignment of the keyboard 108, second display 104, and recess 130 are also shown. In this example, the second display 104 is covered by the keyboard 109 and the tail 128.

Figure 14:
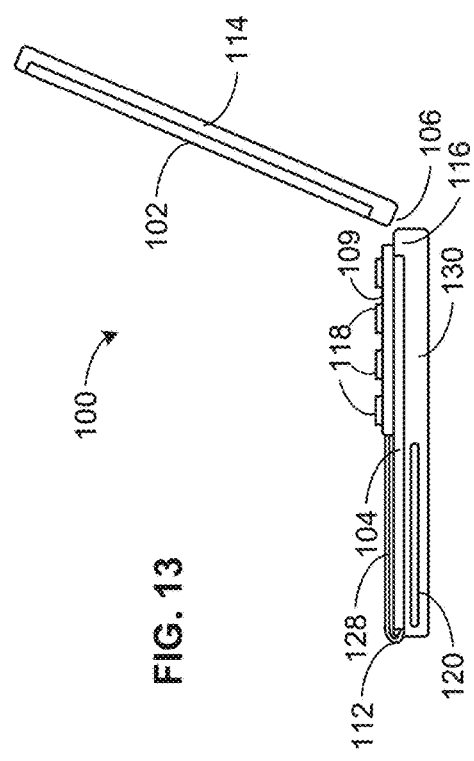
FIG. 14 is an enlarged view of the computing device of FIG. 11 showing example keyboard and display coupling elements.

FIG. 14 is an enlarged view of the computing device 100 of FIG. 11 showing example keyboard and display coupling elements including an example first coupling element 132 disposed in or coupled to the keyboard 108 and an example second coupling element 134 disposed in or coupled to the second housing 116. The first coupling element 132 and second coupling element 134 form means for positioning the keyboard 109 on the second display 104. These example elements can be applied equally the example of FIG. 5. In this example, the first coupling element 132 and the second coupling element 134 are magnetic elements. For example, the first coupling element 132 and the second coupling element 134 maybe magnets. Alternatively, the first coupling element 132 or the second coupling element 134 may be a magnet and the other of the first coupling element 132 or the second coupling element 134 is a magnetizable element such as, for example, a metal plate or bar.

As the first coupling element 132 is brought into proximity with the second coupling element 134, a magnetic force attracts the first coupling element 132 and the second coupling element 134. The magnetic force brings the keyboard 109 into position on the second display 104. The magnetic force may be used to hold the keyboard 109 in place while a user strikes keys 118 of the keyboard 109.

Also, the first coupling element 132 and the second coupling element 134 aide in the proper positioning of the keyboard 109 on the second display 104. This is useful when the keyboard 108 is positioned on the second display 104 as shown in FIG. 5 and the exposed portion 124 of the second display 104 is used to present visual materials to the user. In such examples, the first coupling element 132 and the second coupling element 134 position the keyboard 108 such that the keyboard 108 does not obscure the exposed portion 124 of the second display 104. In some examples, the length of the second hinge 112 also aides in proper placement of the keyboard 109 on the second display 104 in the deployed position.

In some examples, the length of the tail 128 enables the keyboard 109 to be withdrawn from the recess 130 and placed on a surface adjacent to the computing device 100. In such examples, the keyboard 109 may be enabled for use while both the first display 102 and the second display 104 are both enabled for use. Compared to the example of FIG. 5, in this example, the entire second display 104 would be available for the presentation of visual media.

In FIG. 14, the first coupling element 132 is disposed on or in the keyboard 109 on the side of the keyboard 109 facing the user, and the second coupling element 134 is disposed on or in the second housing 116 at or near a midway point of the second housing 116. In other examples, the first coupling element 132 and/or the second coupling element 134 may be disposed in other positions. For example, the second coupling element 132 may be disposed in or on the second housing 116 at or near the second hinge 112 when the keyboard 108 is coupled to the second display 104 as shown in FIG. 5. Also, in some examples, the first coupling element 132 and the second coupling element 134 may be positioned at the rear of the keyboard 109 and second housing 116, respectively, closer to the first hinge 106. In yet other examples, the first coupling element 132 and the second coupling element 134 maybe positioned on one or both lateral or left and right sides of the keyboard 109 and the second housing 116, respectively. Other placements or combination of placements may be used. In addition, though one first coupling element 132 and one second coupling element 134 is shown in FIG. 14, other numbers (e.g., two, three, four, etc.) may be used. Also, the number of first coupling element(s) 132 and the number of second coupling element(s) 134 may not match. For example, there may be two first coupling elements 132 that are couplable to one relatively longer second coupling element 134. In other examples, different first coupling elements 132 are couplable to different second coupling elements 134 in different positions.

In some examples, the first coupling element 132 and the second coupling element 134 incorporate a sensor. In some examples, the sensor is a Hall effect sensor. The sensor, as disclosed in more detail below, can transmit data representative of the placement or presence of the keyboard 109 on the second display 104 including, in some examples, the position of the keyboard 109 on the second display 104. The data indicated of the presence and/or position (and/or absence) of the keyboard 109 may be used to determine an operating mode of the computing device 100. For example, detection of the keyboard 108 on the second display 104 near the second hinge 112 can prompt the computing device 100 to enter a keyboard enabled mode with the first display 102 and the exposed portion 124 of the second display 104 enabled. In addition, detection of the keyboard 109 on the second display 104 near the first hinge 106 can prompt the computing device 100 to enter a keyboard enabled and single display mode with the first display 102 enabled. Further, detection of an absence of the keyboard 109 on the second display 104 can prompt the computing device 100 to enter a dual display mode with the keyboard 109 disabled.

Figure 15:
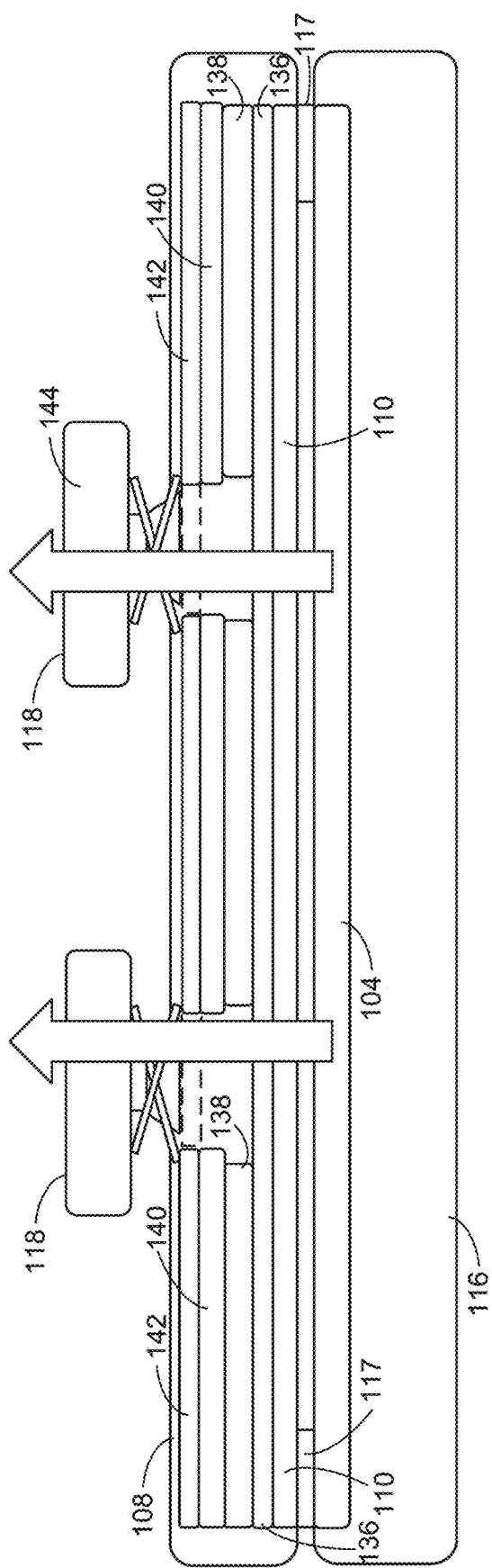
FIG. 15 is a cross-sectional view of the computing device of FIG. 5 taken along the 15-15 line of FIG. 5.

FIG. 15 is a cross-sectional view of the computing device 100 taken along the E-E line of FIG. 5. FIG. 15 illustrates the second display 104 disposed in the second housing 116. The keyboard 108 is disposed on the second display 104, and rests on the second display 104 via the feet 117. As indicated above, all disclosure related to the keyboard 108 applies equally to the keyboard 109 and vice versa, aside from the stowed and deployed positions.

The backplate 110 of the keyboard 108 is a glass or polycarbonate transparent plate. In other examples, the backplate 110 may be made of other transparent or translucent material or combination of materials. In some examples, the backplate 110 is about 550 microns (μm) thick. In other examples, other dimensions may be used. In some examples, an example high transmission rate coating 136 is included above the backplate 110. The high transmission rate coating 136 may be a deco coating including, for example, a non-conductive vapor metallization (NCVM) coating. In other examples, other types of coatings may be used. In some examples, the high transmission rate coating is about 30 μm thick. In other examples, other dimensions may be used. The backplate 110 of a transparent or translucent material and the high transmission rate coating 136 facilitate the transmission of light from the second display 104 up through the keyboard 108 as illustrated by the arrows in FIG. 15. Thus, in some examples, the backplate 110 and/or high transmission rate coating 136 are used for transmitting light through the keyboard 108 when disposed on the second display 104.

In the illustrated example, above the high transmission rate coating 136 is an example light isolating layer 138. The light isolating layer 138 blocks or impedes the transmission of light from the second display 104. The light isolating layer 138 may be a continuous layer or separate, distinct elements. The light isolating layer 138 does not run directly beneath the keys 118 of the keyboard 108. Instead, the light isolating layer 138 is disposed in a layer and around the areas directly, e.g., vertically, below the keys 118. In some examples, the light isolating layer 138 may be a sponge adhesive. In other examples, the light isolating layer 138 is a high density foam, a tape, a neoprene sponge, and/or other material or combination of materials that can form a gasket or gasket-like structure to isolate light. In addition, the light isolating layer 138 includes means for obscuring or otherwise preventing visibility of elements of the keyboard 108 that are disposed above the light isolating layer 138 including, for example, the keys 118 when viewed from the outside of the computing device via the backplate 110, which is transparent or translucent, when the keyboard 108 is in the stowed position of FIG. 2 and FIG. 9. The high transmission rate coating 136 may also aide in making the keyboard components obscured and/or invisible from the other side. In some examples, the light isolating layer 138 is about 150 μm thick. In other examples, other dimensions may be used.

In some examples, above the light isolating layer 138 is an example keyboard base plate 140. Circuitry and other hardware used in the functioning of the keyboard 108 may be coupled to the keyboard base plate 140. The keyboard base plate 140 may be a continuous layer or separate, distinct elements. The keyboard base plate 140 does not run directly beneath the keys 118 of the keyboard 108. Instead, the keyboard base plate 140 has apertures or otherwise is disposed around the areas directly, e.g., vertically, below the keys 118. In some examples, the keyboard base plate 140 is about 200 μm thick. In other examples, other dimensions may be used.

An example keyboard membrane 142 is included above the keyboard base plate 140 and forms the chassis or skin of the keyboard 108. The keyboard membrane 142 does not run directly beneath the keys 118 of the keyboard 108. Instead, the keyboard membrane 142 has apertures or otherwise is disposed around the areas directly, e.g., vertically, below the keys 118. In some examples, the keyboard membrane is about 100 μm thick. In other examples, other dimensions may be used.

The keys 118 appear at the top of the keyboard 108. The keys 118 include example key caps 144 that are connected to the keyboard 108 via example key connectors 146. In the illustrated example, the key connectors are a flexible scissor structure that enable the keys 118 to be depressed. After release of one the keys 118, the corresponding key connectors 146 moves the key 118 upward due to the biasing force of the key connector 146.

Conventional keyboards include a separate keyboard backlit module beneath the support plate. In this example, no separate components are need to illuminate the keys 118. Light from the second display 104 forms means for illuminating the keyboard 108. The light is transmitted through the backplate 110 and the high transmission rate coating 136. The light continues through the areas directly under the keys 118 where the light will not be blocked or otherwise obscured by the light isolation layer 138, the keyboard base plate 140, and/or the keyboard membrane 142. The light continues to be transmitted through the keyboard 108 and through the keys 118 to illuminate the key caps 144.

The feet 117 also surround at least a portion of the backplate 110 and form means for preventing light leakage around the base of the keyboard 108. The illuminated key caps 144 and diminished or eliminated light leakage facilitate use of the keyboard 108 by the user in a dark environment. In addition, the removal of the dedicated keyboard backlit module from the keyboard 108, enables the form factor including, for example, the Z-height of the keyboard 108 to be decreased.

Figure 16:
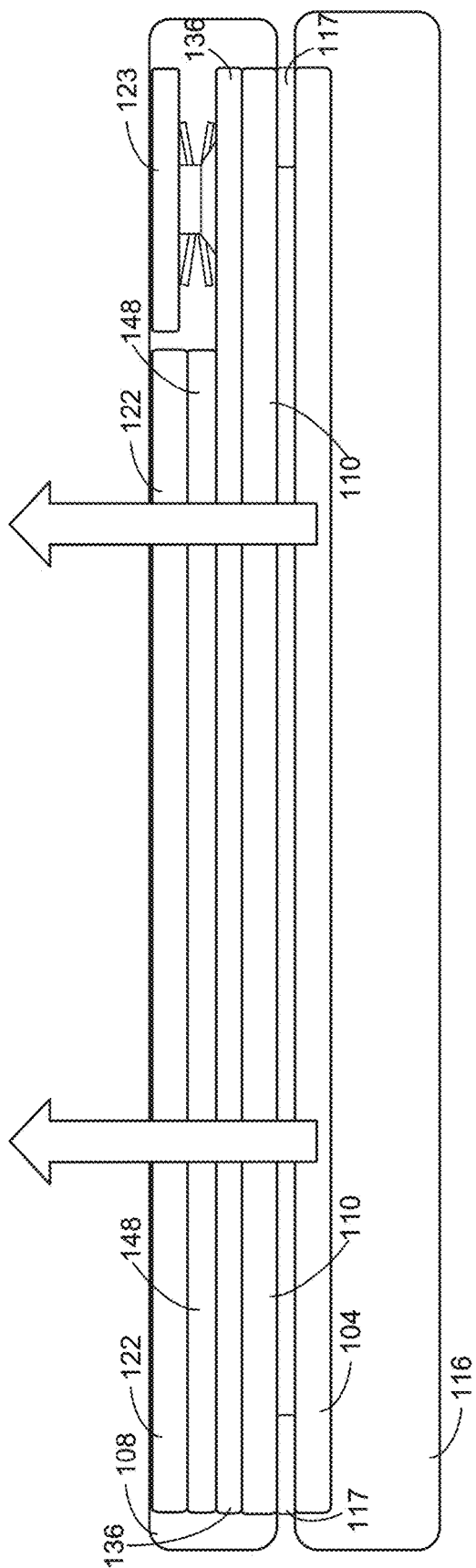
FIG. 16 is a cross-sectional view of the computing device of FIG. 5 taken along the 16-16 line of FIG. 5.

FIG. 16 is a cross-sectional view of the computing device of FIG. 5 taken along the F-F line of FIG. 5. FIG. 16 shows the trackpad 122 and trackpad button 123 as arranged in the keyboard 108. The trackpad 122 is a glass panel, glass plate, or other transparent or translucent material. In this example, the trackpad 122 is about 550 μm thick. In other examples, other dimensions may be used.

The lower layers of the keyboard 108 beneath the trackpad 122 and trackpad button 123 also include the backplate 110, which is made of the transparent or translucent material disclosed above, and the high transmission rate coating 136. Light from the second display 104 can travel through the backplate 110 and the high rate transmission coating 136 and illuminate the trackpad button 123. Also, in this example, the trackpad button 123 is structured similar to one of the keys 118 as disclosed above.

Above the high transmission rate coating 136 and adjacent the area beneath the trackpad key 123 is a mesh layer 148. In this example, the mesh layer 148 is a metal mesh layer for touch. In these examples, the mesh layer 148 senses a user's touch on the trackpad 122 and transmits signals indicative of the touch. Also, in this example, the mesh layer 148 is about 30 μm thick. In other examples, other dimensions may be used.

The example disclosed above includes a trackpad 122 with a surface made of glass and with touch sensor attached on the backside of the trackpad 122. In other examples, the trackpad 122 may include a one glass solution (OGS), with the touch sensor integrated to the glass. In both examples, touch functionality is enabled.

In the example of FIG. 16, no separate liquid crystal display or other display module for the trackpad 122 is needed. The reduction in components enables a smaller form factor and lower manufacturing costs. In these examples, no functionality is lost, as the second display 104 is leveraged to provide the functionality as disclosed above.

The backplate 110, the high transmission rate coating 136, the mesh layer 148, and the plate of the trackpad 122 enable light to be transmitted therethrough. In addition, the backplate 110, the high transmission rate coating 136, the mesh layer 148, and the plate of the trackpad 122 enable the contents of the second display 104 to appear on the trackpad 122. In this example, the second display 104 may be viewed and interacted with by the user via the trackpad 122 device disposed on top of the second display 104. Thus, with the keyboard 108 disposed on the second display, portions of the second display 104 beneath the keyboard may be visible.

FIG. 17 is an enlarged cross-section view of one of the keys 118 of the keyboard 108 and the trackpad key 123. The labeling of the key 118 and the trackpad button 123 in FIG. 17 can be switched, or the figure can represent two keys 118, because the structure of the key connectors 146 of the keys 118 and the trackpad button 123 are the same or substantially similar. In this example, the key connector 146 includes an example scissor structure 150 that biases the key 118 and/or the trackpad button 123 upward and enables the key 118 and/or the trackpad button 123 to be depressed when the user selects the key 118 and/or the trackpad button 123 (as shown by the position of the trackpad button 123 in FIG. 17). When the user releases the key 118 and/or the trackpad button 123, the scissor structure 150 returns the key 118 and/or the trackpad button 123 to the extended position (as shown by the key 118 in FIG. 17).

The key connector 146 also includes an example elastic base 152. The elastic base 152 compresses when the key 118 and/or the trackpad button 123 is depressed. The elastic base 152 returns to the extended or decompressed state when the key 118 and/or the trackpad button 123 is released. The presence and structure of the elastic base 152 contributes to the real typing experience sensed by the user. The elastic base 152 in this example is a rubber base. In other examples, other materials or combination of materials may be used.

The key connector 146 also includes an example conductive tip 154. In this example, the conductive tip 154 is located below the key cap 144 of the key 118 and/or trackpad button 123 and above the elastic base 152. Also, the example conductive tip 154 is a rubber material that is less elastic than the elastic base 152. The conductive tip 154 is rigid and does not compress when the key 118 and/or the trackpad button 123 is depressed. In this example, the conductive tip 154 is a rubber material. In other examples, other materials or combination of materials including other conductive elastomers maybe used.

In the example of FIG. 17, the keyboard 108 does not include a keyboard backlight module, as disclosed above. In addition, in this example, the keyboard 108 does not include the light isolating layer 138, the keyboard base plate 140, or the keyboard membrane 142 under the keys 118. Also, the keyboard 108 lacks the mesh layer 148 under the trackpad 122. In addition, there are no flexible circuits or other hardware running between the keyboard 108 and the main processing board 120 via the second hinge 112. Instead, in this example, there is a software-based or emulated keyboard and trackpad that appear on the second display 104. The user operation of the physical keyboard 108 and trackpad 122 disposed on the top surface of the second display 104 interacts with the second display 104 and specifically the software-based or emulated keyboard and trackpad that are displayed on the second display 104.

To facilitate communication between the physical keyboard 108 and the computing device 100 in the example of FIG. 17, the computing device 100 has established an example activation zone 156. The activation zone is an area above the second display 104 in which hovering can be detected, and the hovering is used as an input triggering mechanism. For example, entry of the conductive tip 154 into the zone can be detected without the conductive tip 154 directly contacting the second display 104.

The computing device 100 includes an example sensor 158 that can detect when the conductive tip 154 enters the activation zone 156. Based on the position and/or alignment of the conductive tip 154 vis-à-vis the software-based keyboard and trackpad on the second display 104 and entry of the conductive tip 154 into the activation zone 156, the sensor 158 can further determine specifically which of the keys 118 and/or the trackpad button 123 the user depressed. With the key 118 and/or trackpad button 123 identified, the sensor 158 transmits a corresponding input command for further processing. In some examples, the sensor 158 and a processor that handles data transmitted from the sensor 158 related to movement of the keys 118 and/or the trackpad button 123 may be incorporated into the keyboard 108.

FIG. 18 is an enlarged view of the first display 102 in which hovering input can be detected. In this example, an example pen or stylus 160 hovers adjacent to the first display 102. The stylus 160 includes a conductive element that is detected by an activation zone of the first display 102. As shown in FIG. 18, an input from the stylus 160 in the form of the example mark 162 is present on the first display 102, though the stylus 160 has not made direct contact with the first display 102.

Figure 19:
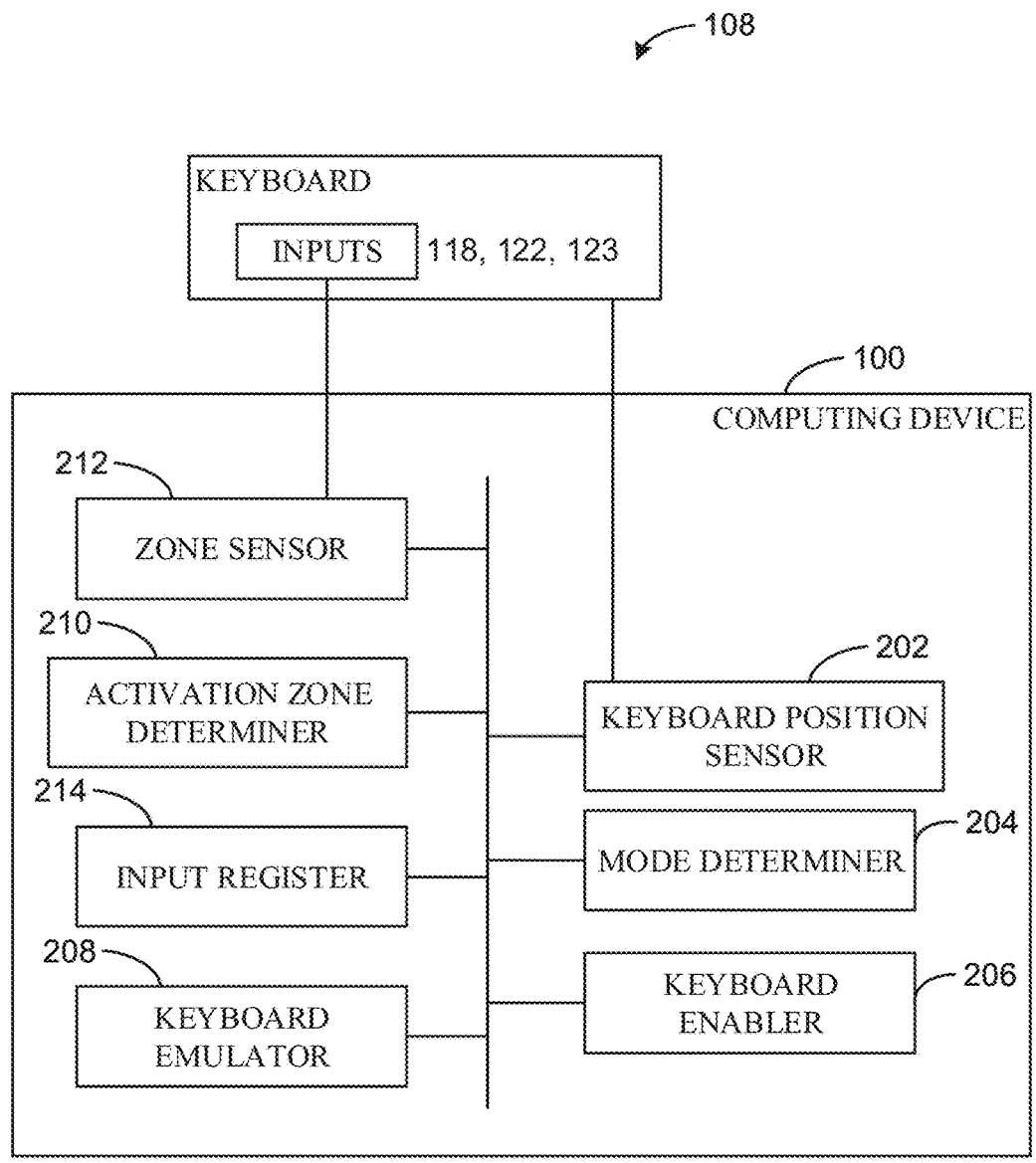
FIG. 19 is a block diagram of the example computing device and the example keyboard of FIG. 1.

FIG. 19 is a block diagram of the example computing device 100 and the example keyboard 108. As disclosed above, the keyboard 108 includes inputs such as, for example, the keys 118, the trackpad 122, and the trackpad button 123. The computing device 100 further includes an example keyboard position sensor 202, an example mode determiner 204, an example keyboard enabler 206, an example keyboard emulator 208, an example activation zone determiner 210, an example zone sensor 212, and an example input register 214.

The keyboard position sensor 202 determines if the keyboard 108 is positioned on the second display 104 and includes means for detecting placement of the keyboard 108 on the second display 104. The keyboard position sensor 202 also determines if the keyboard 108 is positioned on the second display 104 adjacent the first hinge 106, or if the keyboard 108 is positioned on the second display 104 adjacent the second hinge 112. In some examples, the keyboard position sensor 202 includes the Hall effect sensor disclosed above in connection with the first coupling element 132 and the second coupling element 134.

The mode determiner 204 forms means for setting or determining of mode of the computing device 100. Based on the position of the keyboard 108 detected by the keyboard position sensor 202, the mode determiner 204 determines an operating mode for the computing device 100. For example, if the keyboard position sensor 202 determines that the keyboard 108 is not positioned on the second display 104, the mode determiner 204 sets the mode of the computing device 100 to a dual display or multi-display mode in which both the first display 102 and the second display 104 are used to present visual media to the user. If the keyboard position sensor 202 determines that the keyboard 108 is positioned on the second display 104 and is positioned adjacent or otherwise closer to the first hinge 106, the mode determiner 204 sets the mode of the computing device 100 to a single display mode in which the first display 102 is used to present visual media to the user while the second display 104 is used a light source to illuminate the keys 118, trackpad 122, and trackpad button 123 of the keyboard 108. In addition, if the keyboard position sensor 202 determines that the keyboard 108 is positioned on the second display 104 and is positioned adjacent or otherwise closer to the second hinge 112, the mode determiner 204 sets the mode of the computing device 100 to a partially multi-display mode in which the first display 102 is used to present visual media to the user, and the exposed portion 124 of the second display 104 is used to present additional functional operations to the user or other media as disclosed above. The portion of the second display 104 beneath the keyboard 108 is used as a light source to illuminate the keys 118, trackpad 122, and trackpad button 123 of the keyboard 108.

The computing device 100 further includes the keyboard enabler 206 which works in concert with the mode determiner 204 to set an operating mode of the keyboard 108. For example, when the mode determiner 204 sets the operating mode of the computing device 100 to a dual display mode, the keyboard enabler 206 can disable the keyboard 108. Disabling the keyboard 108 prevents registration or processing of input to the keyboard 108 such as, for example, depression of one or more keys 118, touch on or near the trackpad 122, and/or depression of the trackpad button 123. In another example, the keyboard position sensor 202 can detect the placement of the keyboard 108 into the recess 126, 130 on the second side of the second housing 116, and the keyboard enabler 206 disables the keyboard 108 when placement is the recess 126, 130 is detected. In such examples, the keyboard enabler 206 may enable the keyboard 108 though the keyboard 108 is not detected on the second display 104 but is to be used off of the computing device 100.

In other examples, when the mode determiner 204 sets the operating mode of the computing device 100 to a single display mode and/or partially multi-display mode, the keyboard enabler 206 can enable the keyboard 108. Enabling the keyboard 108 allows registration or processing of input to the keyboard 108 such as, for example, depression of one or more keys 118, touch on or near the trackpad 122, and/or depression of the trackpad button 123.

In some examples, when the keyboard 108 enabled, the hovering technology disclosed above in connection with FIG. 17 is used to detect and process operation of the keyboard 108. In some examples, the computing device 100 includes the keyboard emulator 208. The keyboard emulator 208 presents or portrays a keyboard such as, for example, a software-based keyboard on the second display 104 below the keyboard 108. Therefore, in this example, there is an emulated keyboard appearing on the second display 104 under the keyboard 108.

The computing device 100 also includes the activation zone determiner 210. The activation zone determiner 210 sets an activation zone above the second display 104. For example, the activation zone determiner 210 sets an activation zone above the emulated keyboard on the second display 104 that extends into the keyboard 108 such as, for example, the activation zone 156 of FIG. 17.

The zone sensor 212, which may include the sensor 158 of FIG. 17, includes means for detecting movement in the activation zone 156. The zone sensor 212 detects when one of the keys 118 or the trackpad button 123 has been displaced. For example, the zone sensor 212 detects when a portion of one of the keys 118 or the trackpad button 123 has entered the activation zone 156 set by the activation zone determiner 210. For example, the zone sensor 212 detects when the conductive tip 154 of one of the keys 118 crosses into the activation zone 156.

The depth of the activation zone 156 is adjustable. The activation zone determiner 210 can set or adjust the depth of the activation zone 156 based on physical parameters of the keyboard 108. For example, the Z-height or thickness of the keyboard 108, the height of the feet 117, and/or the physical dimensions of the keys 118, the elastic base 152, and/or the conductive tip 154 may be used to set the activation zone 156. In some examples, the elasticity of the elastic base 152 and/or resilience of the scissor structure 150 may be used to set the activation zone 156.

Additionally or alternatively, in some examples, the depth of the activation zone 156 is set in accordance to a desired sensitivity. For example, a deeper activation zone would be more sensitive. In such examples, a relatively smaller movement of one of the keys 118 or the trackpad button 123 would enter the activation zone 156 and, thus, would trigger processing of the corresponding key stroke. In a deeper activation zone, the user can activate the trackpad 122 a relatively higher distance above the surface of the trackpad 122. A shallower activation zone would be less sensitive. For example, a relatively larger movement of one of the keys 118 or the trackpad button 123 would be needed for the key 118 to enter the activation zone 156. Also, a relatively closer finger movement would be needed to activate the trackpad 122 in a less sensitive activation zone.

The example computing device 100 also includes the input register 214, which includes means for processing signals such as input signals and means for registering selection of a key. In some examples, the input register 214 is incorporated into the sensor 158. Also, in some examples, the input register 214 determines which of the keys 118 or the trackpad button 123 entered the activation zone 156 based on an alignment of the key 118 or the trackpad button 123 with a corresponding element on the emulated keyboard that appears on the second display 104 beneath the keyboard 108. When the selected key 118 or the trackpad button 123 is identified, the input register 214 registers or further processes the selection by, for example, sending the selection to the main processing board 120.

Other examples, input related to the selected key 118 or the trackpad button 123 is sent directly from the keyboard 108 to the main processing board 120 via a wired connection disposed in the second hinge 112.

While an example manner of implementing the computing device 100 of FIG. 1 is illustrated in FIG. 19, one or more of the elements, processes and/or devices illustrated in FIG. 19 may be combined, divided, re-arranged, omitted, eliminated, and/or implemented in any other way. Further, the example keyboard position sensor 202, the example mode determiner 204, the example keyboard enabler 206, the example keyboard emulator 208, the example activation zone determiner 210, the example zone sensor 212, and/or the example input register 214 of FIG. 19 may be implemented by hardware, software, firmware, and/or any combination of hardware, software, and/or firmware. Thus, for example, any of the example keyboard position sensor 202, the example mode determiner 204, the example keyboard enabler 206, the example keyboard emulator 208, the example activation zone determiner 210, the example zone sensor 212, and/or the example input register 214 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, example keyboard position sensor 202, the example mode determiner 204, the example keyboard enabler 206, the example keyboard emulator 208, the example activation zone determiner 210, the example zone sensor 212, and/or the example input register 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing device 100 of FIG. 1 may include one or more elements, processes, and/or devices in addition to, or instead of, those illustrated in FIG. 19, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 20:
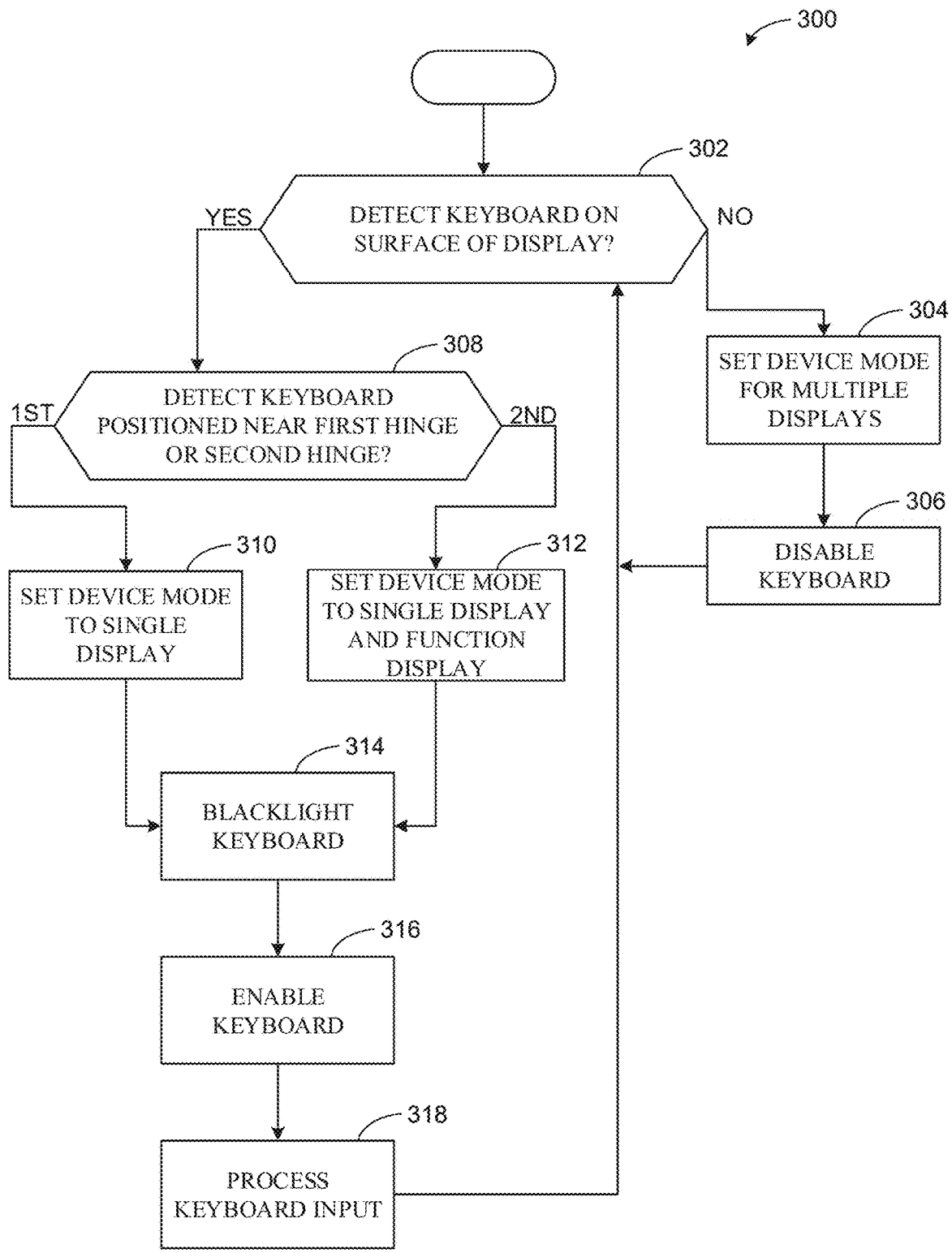
FIG. 20 is a flowchart representative of example machine readable instructions which may be executed to implement the example computing device of FIG. 19.
Figure 21:
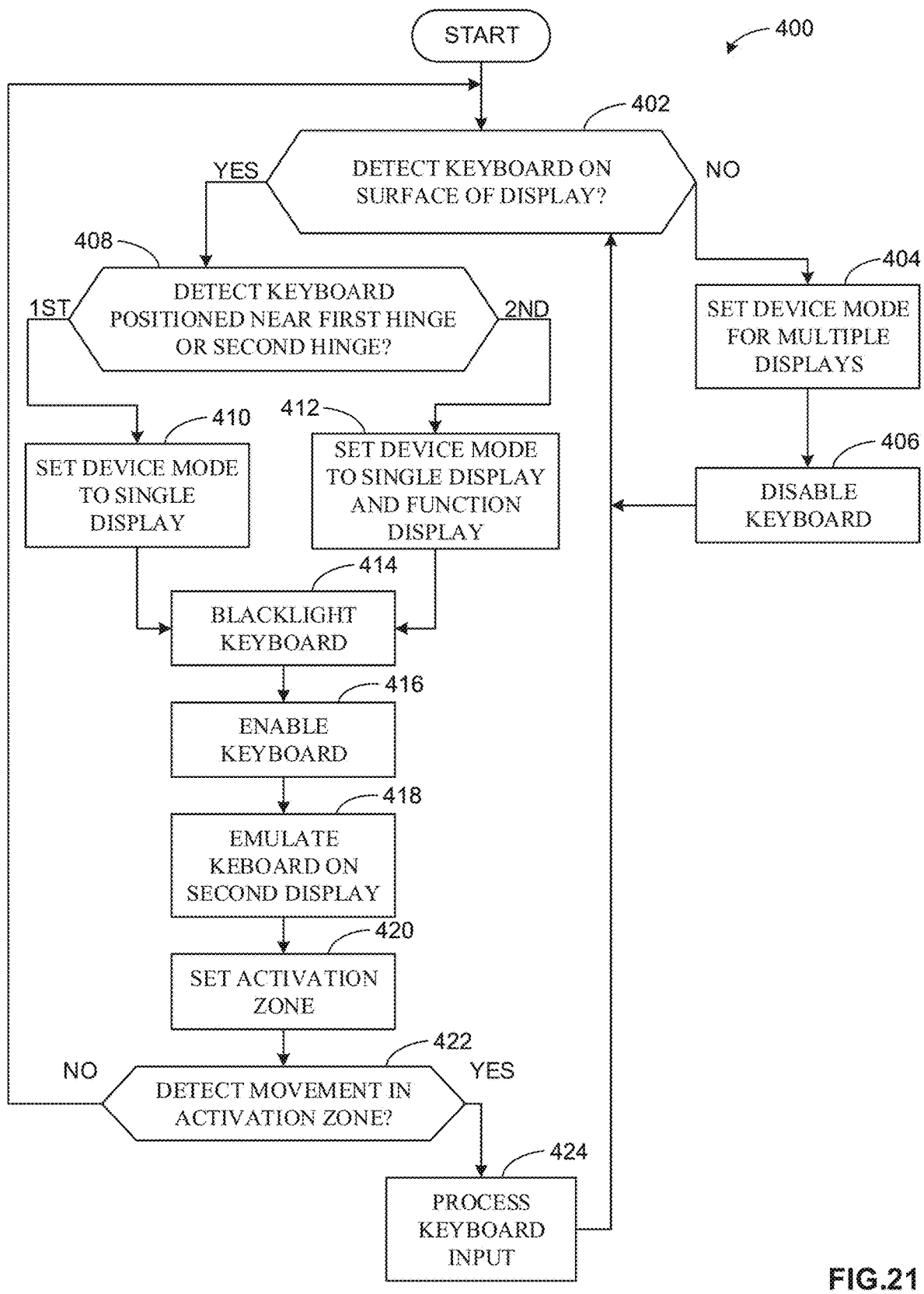
FIG. 21 is a flowchart representative of additional example machine readable instructions which may be executed to implement the example computing device of FIG. 19.

A flowchart representative of example hardware logic, machine readable instructions, hardware implemented state machines, and/or any combination thereof for implementing the computing device 100 of FIG. 19 is shown in FIGS. 20 and 21. The machine readable instructions may be an executable program or portion of an executable program for execution by a computer processor such as the processor 512 shown in the example processor platform 500 discussed below in connection with FIG. 22. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example programs are described with reference to the flowcharts illustrated in FIGS. 20 and 21, many other methods of implementing the example computing device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 20 and 21 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the terms "non-transitory computer readable medium" and "non-transitory machine readable medium" are expressly defined to include any type of computer or machine readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

The program 300 of FIG. 20 illustrates an example operation of the computing device 100 when the keyboard 108 is attached to the computing device 100 via the second hinge 112 and inputs to the keyboard 108 are processed through, for example, wired connections that run through the second hinge 112. In the program 300 of FIG. 20, the keyboard position sensor 202 detects if the keyboard 108 is positioned on the surface of the second display 104 (block 302).

If the keyboard position sensor 202 does not detect that the keyboard 108 is positioned on the surface of the display (block 302), the mode determiner 204 sets the mode of the computing device 100 for multiple displays (block 304). In addition, the keyboard enabler 206 disables the keyboard 108 (block 306) to prevent activation or depression of any of the keys 118 of trackpad button 123 from generating any input signals.

If the keyboard position sensor 202 does detect that the keyboard 108 is positioned on the surface of the display (block 302), the keyboard position sensor 202 also detects if the keyboard 108 is positioned adjacent or near the first hinge (e.g., FIG. 11) or if the keyboard 108 is positioned adjacent or near the second hinge (e.g., FIG. 5) (block 308).

If the keyboard position sensor 202 detects that the keyboard 108 is positioned on the surface of the second display 104 near the first hinge 106 (block 308), the mode determiner 204 sets the mode of the computing device 100 for a single display (block 310).

If the keyboard position sensor 202 detects that the keyboard 108 is positioned on the surface of the second display 104 near the second hinge 112 (block 308), the mode determiner 204 sets the mode of the computing device 100 for a single display with a function display (block 312). In some examples, however, when the keyboard position sensor 202 detects the keyboard 108 on the second display 104 near the second hinge 112, the exposed portion 124 of the second display 104 does not provide function operations or other material. In such examples, the mode determiner 204 sets the mode to a single display mode as shown in block 310.

The example program 300 also includes the computing device 100 using the second display as a light source to backlight the keyboard 108 (block 314). For example, the light from the second display 104 is propagating through the layers of the computing device 100 as disclosed above with FIGS. 17 and 18.

In the single display mode or the single display and function display mode, the keyboard enabler 206 enables the keyboard 108 (block 316). The input register 214 registers or processes input into the keyboard 108 when enabled (block 318). For example, when the keyboard 108 is enabled, a depression or selection of one of the keys 118 and/or the trackpad button 123 or touch input to the trackpad 122 will be processed by the computing device 100.

The example program 300 continues with the keyboard position sensor 202 determining if the keyboard 108 is detected on the second display 104 (block 302). Movement of the keyboard 108 with respect to the second display 104 will cause different operation of the example program 300.

The program 400 of FIG. 21 illustrates an example operation of the computing device 100 when the keyboard 108 implements hover technology to detect input to the keyboard 108 and trigger processing of the input. In this example, the keyboard 108 may or may not be tethered to the computing device 100 via the second hinge 112.

In the program 400 of FIG. 21, the keyboard position sensor 202 detects if the keyboard 108 is positioned on the surface of the second display 104 (block 402). If the keyboard position sensor 202 does not detect that the keyboard 108 is positioned on the surface of the display (block 402), the mode determiner 204 sets the mode of the computing device 100 for multiple displays (block 404). In addition, the keyboard enabler 206 disables the keyboard 108 (block 406) to prevent activation or depression of any of the keys 118 of trackpad button 123 from generating any input signals.

If the keyboard position sensor 202 does detect that the keyboard 108 is positioned on the surface of the display (block 402), the keyboard position sensor 202 also detects if the keyboard 108 is positioned adjacent or near the first hinge (e.g., FIG. 11) or if the keyboard 108 is positioned adjacent or near the second hinge (e.g., FIG. 5) (block 408).

If the keyboard position sensor 202 detects that the keyboard 108 is positioned on the surface of the second display 104 near the first hinge 106 (block 408), the mode determiner 204 sets the mode of the computing device 100 for a single display (block 410).

If the keyboard position sensor 202 detects that the keyboard 108 is positioned on the surface of the second display 104 near the second hinge 112 (block 408), the mode determiner 204 sets the mode of the computing device 100 for a single display with a function display (block 412). In some examples, however, when the keyboard position sensor 202 detects the keyboard 108 on the second display 104 near the second hinge 112, the exposed portion 124 of the second display 104 does not provide function operations or other material. In such examples, the mode determiner 204 sets the mode to a single display mode as shown in block 410.

The example program 400 also includes the computing device 100 using the second display as a light source to backlight the keyboard 108 (block 414). For example, the light from the second display 104 is propagating through the layers of the computing device 100 as disclosed above with FIGS. 17 and 18.

In the single display mode or the single display and function display mode, the keyboard enabler 206 enables the keyboard 108 (block 416). The keyboard emulator 208 presents an emulated keyboard 108 on the second display 104 under the keyboard 108 (block 418).

In the example program 400 of FIG. 21, the activation zone determiner 210 sets an activation zone (block 420) such as, for example, the activation zone 156 of FIG. 17 above the second display 104. The activation zone 156 has a depth that correlates to the sensitivity of the keys 118 or trackpad button 123. For example, a larger or deeper activation zone 156 would detect a smaller movement of one of the keys 118 or the trackpad button 123 because the corresponding conductive tip 154 would enter the activation zone 156 sooner than if the activation zone 156 were shallower. The activation zone determiner 210 can set the activation zone 156 based on a desired sensitivity and/or physical characteristics of the keyboard 108, keys, and/or trackpad button 123 as disclosed above.

The zone sensor 212 and/or the sensor 158 detect if there is movement in the activation zone 156 (block 422). For example, the zone sensor 212 detects when the conductive tip 154 of one of the keys 118 descends into the activation zone 156 when pressed by a user.

If the zone sensor 212 does not detect movement in the activation zone 156 (block 422), there is no input to register or process, and the example program 400 continues with the keyboard position sensor 202 determining if the keyboard 108 is detected on the second display 104 (block 402). In addition, if the zone sensor 212 does not detect movement in the activation zone 156 (block 422), and there is no movement of the keyboard 108, the process 400 will progress as disclosed above until the zone sensor 212 detects movement in the activation zone 156 (block 422) or the keyboard position sensor 202 detects a repositioning of the keyboard 108 (block 408) or removal of the keyboard 108 from the second display 104 (block 420).

If the zone sensor 212 does detect movement in the activation zone 156 (block 422), the input register 214 registers or processes the input (block 424). For example, the input register 214 correlates the depressed or selected key 118 or trackpad button 123 with a corresponding feature or element of the emulated keyboard on the second display 104. The corresponding element is processed as the selected key 118 or trackpad button 123 (block 424).

The example program 300 continues with the keyboard position sensor 202 determining if the keyboard 108 is detected on the second display 104 (block 402). Movement of the keyboard 108 with respect to the second display 104 will cause different operation of the example program 400.

Figure 22:
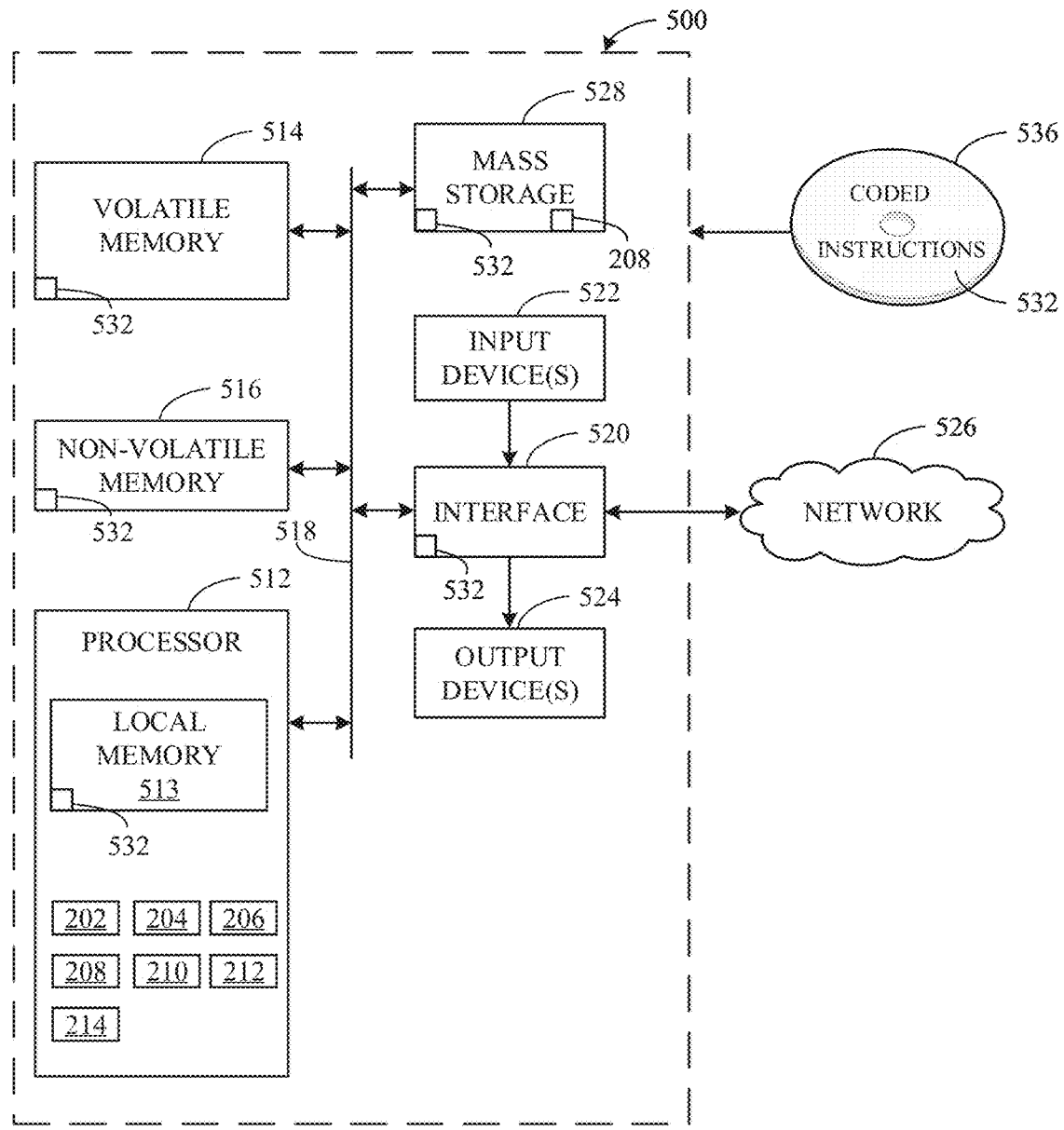
FIG. 22 is a block diagram of an example processing platform structured to execute the instructions of FIGS. 20 and 21 to implement the computing device of FIG. 19.

FIG. 22 is a block diagram of an example processor platform 500 structured to execute the instructions of FIGS. 20 and 21 to implement the computing device 100 of FIGS. 1 and 19. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example keyboard position sensor 202, the example mode determiner 204, the example keyboard enabler 206, the example keyboard emulator 208, the example activation zone determiner 210, the example zone sensor 212, and the example input register 214.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 20 and 21 may be stored in the mass storage device 528, in the volatile memory 514, in the non-volatile memory 516, and/or on a removable non-transitory computer readable storage medium such as a CD or DVD.

From the foregoing, it will be appreciated that example apparatus, systems, articles of manufacture, and methods have been disclosed that enable dual and flexible display form factors with physical keyboard that do not sacrifice a keyboard typing experience, manufacturing costs, and appearance. The disclosed apparatus, systems, articles of manufacture, and methods improve the use a computing device by providing the user with a physical keyboard typing experience while reducing the complexity of the physical keyboard by removing backlighting modules and some input processing from the physical keyboards while maintaining the same functions. The disclosed apparatus, articles of manufacture, and methods are accordingly directed to one or more improvement(s) in the functioning of a computer.

Disclosed herein are example apparatus, system, articles of manufacture, and methods related to computing devices and physical keyboards. Example 1 includes a computing device that includes a first display and a second display coupled to the first display via a first hinge. The computing device of Example 1 also includes a keyboard coupled to the second display via a second hinge.

Example 2 includes the computing device of Example 1, further including a housing, the second display disposed on a first side of the housing, a recess disposed on a second side of the housing, the keyboard stowable in the recess.

Example 3 includes the computing device of Example 2, wherein the recess is disposed adjacent the first hinge.

Example 4 includes the computing device of Example 2, wherein the recess is disposed adjacent the second hinge.

Example 5 includes the computing device of Example 2, wherein the keyboard is disposed on the second display in a use position.

Example 6 includes the computing device of Example 5, further including a sensor to detect placement of the keyboard on the second display.

Example 7 includes the computing device of Example 6, further including a first magnetic element coupled to the keyboard, and a second magnetic element coupled to the housing, the keyboard magnetically couplable to the second display via the first magnetic element and the second magnetic element.

Example 8 includes the computing device of Example 7, wherein the sensor is a Hall effect sensor.

Example 9 includes the computing device of Example 6, further including a processor in communication with the sensor, the processor to place the computing device in a single display and keyboard mode when the sensor detects placement of the keyboard on the second display.

Example 10 includes the computing device of Example 6, further including a processor in communication with the sensor, the processor to place the computing device in a dual display mode when the sensor does not detect placement of the keyboard on the second display.

Example 11 includes the computing device of Example 10, wherein the processor is to disable the keyboard when the computing device is in the dual display mode.

Example 12 includes the computing device of Example 1, wherein the second hinge is a soft hinge.

Example 13 includes the computing device of Example 12, wherein the second hinge includes a flexible band.

Example 14 includes the computing device of Example 12, further including a processor, and a flexible printed circuit disposed in the second hinge to transmit signals between the processor and the keyboard.

Example 15 includes the computing device of Example 1, further including a housing, the second display disposed on a first side of the housing, the housing having a first height, the keyboard having a second height, the second height less than the first height.

Example 16 includes the computing device of Example 1, wherein the keyboard includes a translucent backplate and the second display is to illuminate portions of the keyboard when the keyboard is disposed on the second display.

Example 17 includes the computing device of Example 16, further including a looped foot disposed on the backplate to prevent leakage of light.

Example 18 includes the computing device of Example 16, further including a coating disposed between the backplate and keys of the keyboard, the coating to obscure the keys when the keyboard is in a stowed position and the coating to transmit light when the keyboard is disposed on the second display.

Example 19 includes the computing device of Example 1, further including a trackpad coupled adjacent the keyboard, the trackpad including a glass panel, wherein a portion of the second display is visible through the trackpad when the trackpad is disposed on the second display.

Example 20 includes the computing device of Example 19, wherein the portion of the second display visible through the trackpad is manipulatable through the trackpad.

Example 21 includes the computing device of Example 1, further including a sensor having an activation zone above the second display, the sensor to detect a movement within the activation zone.

Example 22 includes the computing device of Example 21, wherein the movement is movement of a key of the keyboard when a portion of the key enters the activation zone.

Example 23 includes the computing device of Example 22, wherein the portion of the key is a conductive tip.

Example 24 includes the computing device of Example 22, further including a processor to register selection of the key based on the movement detection by the sensor.

Example 25 includes the computing device of Example 21, wherein the movement is movement of a finger of a user or of a stylus within the activation zone and above the second display.

Example 26 includes a computing device that includes a first display, a second display coupled to the first display via a hinge, and a keyboard couplable to the second display, the keyboard including a translucent backplate and the second display is to illuminate portions of the keyboard when the keyboard is disposed on the second display.

Example 27 includes the computing device of Example 26, further including a looped foot disposed on the backplate to prevent leakage of light.

Example 28 includes the computing device of Example 26, further including a housing having a first side in which the second display is disposed and a second side into which the keyboard is stowable, and a coating disposed between the backplate and keys of the keyboard, the coating to obscure the keys when the keyboard is stowed in a recess and the coating to transmit light when the keyboard is disposed on the second display.

Example 29 includes the computing device of Example 26, further including a trackpad coupled adjacent the keyboard, the trackpad including a glass panel, wherein a portion of the second display is visible through the trackpad when the trackpad is disposed on the second display.

Example 30 includes the computing device of Example 29, wherein the portion of the second display visible through the trackpad is manipulatable through the trackpad.

Example 31 includes a computing device that includes a first display, a second display coupled to the first display via a first hinge, a keyboard couplable to the second display, and a sensor having an activation zone above the second display, the sensor to detect a movement within the activation zone.

Example 32 includes the computing device of Example 31, wherein the movement is movement of a key of the keyboard when a portion of the key enters the activation zone.

Example 33 includes the computing device of Example 32, wherein the portion of the key is a conductive tip.

Example 34 includes the computing device of Example 32, further including a processor to register selection of the key based on the movement detection by the sensor.

Example 35 includes the computing device of Example 31, wherein the movement is movement of a finger of a user or of a stylus within the activation zone and above the second display.

Example 36 includes a computing device that includes a first display, a second display, means for coupling the first display and the second display, a keyboard, and means for coupling the keyboard to the second display.

Example 37 includes the computing device of Example 36, further including a housing, the second display disposed on a first side of the housing, and means for stowing the keyboard on a second side of the housing.

Example 38 includes the computing device of Example 37, wherein the means for stowing is disposed adjacent the means for coupling the first display and the second display.

Example 39 includes the computing device of Example 37, wherein the means for stowing is disposed adjacent the means for coupling the keyboard to the second display.

Example 40 includes the computing device of Example 37, wherein the keyboard is disposed on the second display in a use position.

Example 41 includes the computing device of Example 40, further including means for detecting placement of the keyboard on the second display.

Example 42 includes the computing device of Example 41, further including means for positioning the keyboard on the second display.

Example 43 includes the computing device of Example 42, wherein the means for positioning the keyboard on the second display includes a Hall effect sensor.

Example 44 includes the computing device of Example 41, further including means for setting the computing device in a single display and keyboard mode when the means for detecting detects placement of the keyboard on the second display.

Example 45 includes the computing device of Example 41, further including means for setting the computing device in a dual display mode when the means for detecting does not detect placement of the keyboard on the second display.

Example 46 includes the computing device of Example 45, wherein the means for setting is to disable the keyboard when the computing device is in the dual display mode.

Example 47 includes the computing device of Example 36, wherein the means for coupling the keyboard to the second display includes a soft hinge.

Example 48 includes the computing device of Example 47, wherein the means for coupling the keyboard to the second display includes a flexible band.

Example 49 includes the computing device of Example 47, further including means for processing signals, and a flexible printed circuit disposed in the means for coupling the keyboard to the second display to transmit the signals between the means for processing and the keyboard.

Example 50 includes the computing device of Example 36, further including a housing, the second display disposed on a first side of the housing, the housing having a first height, the keyboard having a second height, the second height less than the first height.

Example 51 includes the computing device of Example 36, wherein the keyboard includes a translucent backplate and the second display is to illuminate portions of the keyboard when the keyboard is disposed on the second display.

Example 52 includes the computing device of Example 51, further including means to prevent leakage of light disposed on the backplate.

Example 53 includes the computing device of Example 51, further including means for obscuring the keys when the keyboard is in a stowed position and transmitting light when the keyboard is disposed on the second display.

Example 54 includes the computing device of Example 36, further including a trackpad coupled adjacent the keyboard, the trackpad including a glass panel, wherein a portion of the second display is visible through the trackpad when the trackpad is disposed on the second display.

Example 55 includes the computing device of Example 54, wherein the portion of the second display visible through the trackpad is manipulatable through the trackpad.

Example 56 includes the computing device of Example 36, further including means for detecting a movement within an activation zone about the second display.

Example 57 includes the computing device of Example 56, wherein the movement is movement of a key of the keyboard when a portion of the key enters the activation zone.

Example 58 includes the computing device of Example 57, wherein the portion of the key is a conductive tip.

Example 59 includes the computing device of Example 57, further including means for registering selection of the key based on the detected movement.

Example 60 includes the computing device of Example 56, wherein the movement is movement of a finger of a user or of a stylus within the activation zone and above the second display.

Example 61 includes a computing device that includes a first display, a second display, means for coupling to the first display and the second display, a keyboard couplable to the second display, and means illuminating portions of the keyboard with the second display when the keyboard is disposed on the second display.

Example 62 includes the computing device of Example 61, further means for preventing leakage of light disposed on the keyboard.

Example 63 includes the computing device of Example 61, further including a housing having a first side in which the second display is disposed, means for stowing the keyboard on a second side of the housing, and means for obscuring the keys when the keyboard is stowed and for transmitting light when the keyboard is disposed on the second display.

Example 64 includes the computing device of Example 61, further including a trackpad coupled adjacent the keyboard, the trackpad including a glass panel, wherein a portion of the second display is visible through the trackpad when the trackpad is disposed on the second display.

Example 65 includes the computing device of Example 64, wherein the portion of the second display visible through the trackpad is manipulatable through the trackpad.

Example 66 includes a computing device that includes a first display, a second display, means for coupling the first display to the second display, a keyboard couplable to the second display, and means for detecting a movement within an activation zone above the second display.

Example 67 includes the computing device of Example 66, wherein the movement is movement of a key of the keyboard when a portion of the key enters the activation zone.

Example 68 includes the computing device of Example 67, wherein the portion of the key is a conductive tip.

Example 69 includes the computing device of Example 67, further including means for registering selection of the key based on the movement.

Example 70 includes the computing device of Example 66, wherein the movement is movement of a finger of a user or of a stylus within the activation zone and above the second display.

Example 71 includes non-transitory computer readable storage medium that includes computer readable instructions that, when executed, cause one or more processors to, at least: detect placement of a keyboard on a display of a computing device having a plurality of displays; place the computing device in a single display and keyboard mode when the placement of the keyboard on the display is detected; and place the computing device in a multi-display mode when the placement of the keyboard on the display is not detected.

Example 72 includes the storage medium of Example 71, wherein the instructions further cause the one or more processors to disable the keyboard when the computing device is in the multi-display mode.

Example 73 includes the storage medium of Example 71, wherein the instructions further cause the one or more processors to use the display to illuminate portions of the keyboard when the keyboard is disposed on the display.

Example 74 includes the storage medium of Example 71, wherein the instructions further cause the one or more processors to detect a movement within an activation zone above the display.

Example 75 includes the storage medium of Example 74, wherein the movement is a movement of a key of the keyboard when a portion of the key enters the activation zone.

Example 76 includes the storage medium of Example 75, wherein the portion of the key is a conductive tip.

Example 77 includes the storage medium of Example 74, wherein the instructions further cause the one or more processors to register selection of the key based on the detected movement.

Example 78 includes the storage medium of Example 74, wherein the movement is movement of a finger of a user or of a stylus within the activation zone and above the display.

Example 79 includes a method that includes: detecting, by executing instructions with a processor, placement of a keyboard on a display of a computing device having a plurality of displays; placing, by executing instructions with the processor, the computing device in a single display and keyboard mode when the placement of the keyboard on the display is detected; and placing, by executing instructions with the processor, the computing device in a multi-display mode when the placement of the keyboard on the display is not detected.

Example 80 includes the method of Example 79, further including disabling, by executing instructions with the processor, the keyboard when the computing device is in the multi-display mode.

Example 81 includes the method of Example 79, further including using, by executing instructions with the processor, the display to illuminate portions of the keyboard when the keyboard is disposed on the display.

Example 82 includes the method of Example 79, further including detecting, by executing instructions with the processor, a movement within an activation zone above the display.

Example 83 includes the method of Example 82, wherein the movement is a movement of a key of the keyboard when a portion of the key enters the activation zone.

Example 84 includes the method of Example 83, wherein the portion of the key is a conductive tip.

Example 85 includes the method of Example 82, further including registering, by executing instructions with the processor, selection of the key based on the detected movement.

Example 86 includes the method of Example 82, wherein the movement is movement of a finger of a user or of a stylus within the activation zone and above the display.

Example 87 includes a keyboard that includes a plurality of keys, a translucent backplate having a first side and a second side, and a coating disposed between the first side of the backplate and the plurality of keys, the coating to transmit light from the backplate to the plurality of keys, and the coating to obscure the plurality keys when viewed from the second side of the backplate.

Example 88 includes the keyboard of Example 87, further including a trackpad coupled adjacent the keyboard, the trackpad including a glass panel, wherein a device on which the keyboard is positionable is manipulatable through the trackpad.

Example 89 includes the keyboard of Example 87, further including a trackpad coupled adjacent the keyboard, the trackpad including a glass panel, wherein a device on which the keyboard is positionable is visible through the trackpad.

Example 90 includes the keyboard of Example 87, further including a sensor having an activation zone, the sensor to detect a movement within the activation zone.

Example 91 includes the keyboard of Example 90, wherein the movement is movement of a key of the keyboard when a portion of the key enters the activation zone.

Example 92 includes they keyboard of Example 91, wherein the portion of the key is a conductive tip.

Example 93 includes the keyboard of Example 91, further including a processor to register selection of the key based on the movement detection by the sensor.

Example 94 includes the keyboard of Example 87, the keyboard stowable in a computing device.

Example 95 includes the keyboard of Example 94, further including a fastener to couple the keyboard to the computing device in a stowed position.

Example 96 includes the keyboard of Example 95, the fastener including a magnetic fastener.

Example 97 includes a keyboard that includes a plurality of keys, a translucent backplate having a first side and a second side, and means for transmitting light from the backplate to the plurality of keys and for obscuring the plurality keys when viewed from the second side of the backplate.

Example 98 includes the keyboard of Example 97, further means for detecting movement of a key of the plurality of keys.

Example 99 includes the keyboard of Example 97, further including means for releasably securing the keyboard to a recess of a computing device in a stowed position.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An electronic device comprising:
   a first housing;
   a first display area carried by the first housing;
   a second housing;
   a second display area carried by the second housing;
   a hinge rotatably coupling the first housing and the second housing;
   wireless communication circuitry; and
   a physical keyboard removably positionable on the second housing, the physical keyboard to wirelessly communicate with the communication circuitry when the physical keyboard is coupled to the second housing, and the physical keyboard to wirelessly communicate with the communication circuitry when the physical keyboard is detached from the first housing and the second housing, the physical keyboard stowable on the electronic device.

2. The electronic device of claim 1, further including a magnet to couple the physical keyboard to the second housing.

3. The electronic device of claim 2, wherein the magnet is to place the physical keyboard on the second housing to expose a subportion of the second display to the user.

4. The electronic device of claim 2, wherein the magnet is positioned at a perimeter of the physical keyboard.

5. The electronic device of claim 1, further including leather coupled to the second housing.

6. The electronic device of claim 1, wherein the physical keyboard includes a touch pad.

7. The electronic device of claim 1, further including programmable circuitry to cause display of emojis in response to an operation of the physical keyboard.

8. The electronic device of claim 1, further including programmable circuitry to accept user voice commands.

9. The electronic device of claim 1, further including programmable circuitry to present an on-screen keyboard.

10. An electronic device comprising:
    a first housing;
    a first display area carried by the first housing;
    a second housing;
    a second display area carried by the second housing;
    means for displaying content in the first display area and the second display area;
    means for rotatably coupling the first housing and the second housing;
    a physical keyboard removably positionable on the second housing, the physical keyboard stowable on the electronic device; and
    means for wirelessly communicating with the physical keyboard when the physical keyboard is (1) coupled to the second housing and (2) detached from the first housing and the second housing, the physical keyboard stowable on the electronic device.

11. The electronic device of claim 10, further including means for magnetically coupling the physical keyboard to the second housing.

12. The electronic device of claim 10, further including leather coupled to the second housing.

13. The electronic device of claim 10, further including means for causing display of emojis in response to an operation of the physical keyboard.

14. The electronic device of claim 10, further including means for accepting and interpreting user voice commands.

15. The electronic device of claim 10, further including means for presenting an on-screen keyboard.

16. An electronic device comprising:
    a first housing;
    a first display area carried by the first housing;
    a second housing;
    a second display area carried by the second housing;
    a hinge rotatably coupling the first housing and the second housing; and
    wireless communication circuitry to:
       communicate with a physical keyboard when the physical keyboard is coupled to the second housing, and communicate with the physical keyboard when the physical keyboard is detached from the first housing and the second housing, wherein the electronic device is configured to stow the physical keyboard.

17. The electronic device of claim 16, further including a magnet to couple the physical keyboard to the second housing.

18. The electronic device of claim 16, further including a leather fabric coupled to the second housing.

19. The electronic device of claim 16, further including programmable circuitry to cause display of emojis in response to an operation of the physical keyboard.

20. The electronic device of claim 16, further including programmable circuitry to accept user voice commands.

* * * * *